(12) United States Patent
Chen et al.

(10) Patent No.: US 11,849,427 B2
(45) Date of Patent: Dec. 19, 2023

(54) MANAGING THE SELECTION OF REFERENCE PHYSICAL DOWNLINK CONTROL CHANNEL (PDCCH) CANDIDATES IN DEPLOYMENTS FEATURING PDCCH REPETITION WITH OVERLAPPING SEARCH SPACE (SS) SETS

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 17/213,171

(22) Filed: Mar. 25, 2021

(65) Prior Publication Data

US 2022/0312381 A1    Sep. 29, 2022

(51) Int. Cl.
*H04W 72/23* (2023.01)
*H04W 72/0446* (2023.01)
(Continued)

(52) U.S. Cl.
CPC ........... *H04W 72/02* (2013.01); *H04W 24/08* (2013.01); *H04W 72/0446* (2013.01);
(Continued)

(58) Field of Classification Search
CPC . H04W 72/02; H04W 24/08; H04W 72/0446; H04W 72/0453; H04W 72/1273;
(Continued)

(56) References Cited

U.S. PATENT DOCUMENTS

| 11,647,525 B2 * | 5/2023 | Kim | H04W 24/08 370/329 |
| 2021/0067268 A1 * | 3/2021 | Seo | H04L 25/0238 |

(Continued)

OTHER PUBLICATIONS

International Search Report and Written Opinion—PCT/US2022/017752—ISA/EPO—dated Jun. 10, 2022.
(Continued)

*Primary Examiner* — Jae Y Lee
*Assistant Examiner* — Aixa A Guadalupe Cruz
(74) *Attorney, Agent, or Firm* — Arun Swain

(57) ABSTRACT

This disclosure provides systems, methods and apparatus, including computer programs encoded on computer storage media, for maintaining, between a user equipment (UE) and a component of a base station (BS), a mutual understanding of multiple sets of linked physical downlink control channel (PDCCH) candidates if some PDCCH candidates of the multiple sets of linked PDCCH candidates occupy a same set of resources. In one aspect, the UE may select to monitor one of the PDCCH candidates that occupy the same set of resources in accordance with a prioritization rule. Upon selecting one of the PDCCH candidates that occupy the same set of resources for monitoring by the UE, the UE and the component of the BS may select a reference PDCCH candidate for one or more of the multiple sets of PDCCH candidates in accordance with a reference selection rule.

30 Claims, 12 Drawing Sheets

(51) Int. Cl.
*H04W 72/02* (2009.01)
*H04W 24/08* (2009.01)
*H04W 72/0453* (2023.01)
*H04W 72/1273* (2023.01)
*H04W 72/53* (2023.01)

(52) U.S. Cl.
CPC ... *H04W 72/0453* (2013.01); *H04W 72/1273* (2013.01); *H04W 72/23* (2023.01); *H04W 72/53* (2023.01)

(58) Field of Classification Search
CPC .... H04W 72/23; H04L 5/0048; H04L 5/0064; H04L 5/0094; H04L 5/0053
See application file for complete search history.

(56) References Cited

U.S. PATENT DOCUMENTS

| | | | | |
|---|---|---|---|---|
| 2021/0282123 | A1* | 9/2021 | Wong | H04L 1/08 |
| 2021/0329647 | A1* | 10/2021 | Park | H04L 1/0038 |
| 2021/0385826 | A1* | 12/2021 | Moon | H04L 1/0038 |
| 2022/0225284 | A1* | 7/2022 | Hakola | H04W 72/1263 |

OTHER PUBLICATIONS

Moderator (Qualcomm): "Discussion Summary for mTRP PDCCH Reliability Enhancements", 3GPP TSG-RAN WG1 Meeting #104-e, 3GPP Draft, R1-2101838, 3rd Generation Partnership Project (3GPP), Mobile Competence Centre, .650, Route Des Lucioles, F-06921 Sophia-Antipolis Cedex, France, vol. RAN WG1, No. e-Meeting, Jan. 25, 2021-Feb. 5, 2021, Jan. 29, 2021 (Jan. 29, 2021), 49 Pages, XP051975934, Retrieved from the Internet: URL: https://ftp.3gpp.org/tsg_ran/WG1_RL1/TSGR1_104-e/Docs/R1-2101838.zip R1-2101838 Summary #1 of email discussions [104-e-NR-feMIMO-02] for mTRP PDCCH enhancements.docx [retrieved on Jan. 29, 2021] sections 1, 2.1, 2.3.1, 2.4.1, 2.5.3, 2.5.4, 3, Sect1ons 2.3, 2.5.2,2.5.3 and Section 3.
Moderator (Qualcomm): "Summary #3 of email Discussions [104-e-NR-feMIMO-02] for mTRP PDCCH Enhancements", 3GPP Draft, R1-2101954, 3GPP TSG RAN WG1 #104-e, vol. RAN WG1, No. e-Meeting, Jan. 25, 2021-Feb. 5, 2021, Feb. 5, 2021 (Feb. 5, 2021), XP051977640, 22 Pages, Retrieved from the Internet :URL: https://ftp.3gpp.org/tsg_ran/WG1_RL1/TSGR1_104-e/Docs/R1-2101954.zip R1-2101954 Summary #3 of email discussions [104-e-NR-feMIMO-02] for mTRP PDCCH enhancements.docx [retrieved on Feb. 5, 2021] Sections 1-4.
Nokia, et al., "Enhancements for Multi-TRP URLLC Schemes", 3GPP Draft, R1-2101006, 3GPP TSG RAN WG1 #104-e Meeting, vol. RAN WG1, No. e Meeting, Jan. 25, 2021-Feb. 5, 2021, Jan. 18, 2021 (Jan. 18, 2021), XP051970594, 22 pages, Retrieved from the Internet: URL:https://ftp.3gpp.org/tsg_ran/WG1_RL1/TSGR1_104-e/Docs/R1-2101006.zip R1-2101006_M-TRP_URLLC.docx [retrieved on Jan. 18, 2021] Sections 1-3.

* cited by examiner

US 11,849,427 B2

MANAGING THE SELECTION OF REFERENCE PHYSICAL DOWNLINK CONTROL CHANNEL (PDCCH) CANDIDATES IN DEPLOYMENTS FEATURING PDCCH REPETITION WITH OVERLAPPING SEARCH SPACE (SS) SETS

TECHNICAL FIELD

This disclosure relates to wireless communications, including managing the selection of reference physical downlink control channel (PDCCH) candidates in deployments featuring PDCCH repetition with overlapping search space (SS) sets.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some systems, a UE may monitor over a control channel, such as a physical downlink control channel (PDCCH), for control information from a BS. In some aspects, the UE may decode the control information and the UE and the BS may use the control information to support communication between the UE and the BS.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving an indication of a first set of linked physical downlink control channel (PDCCH) candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources, selecting to monitor the first PDCCH candidate instead of the third PDCCH candidate as a result of a resource overlap between the first PDCCH candidate and the third PDCCH candidate, and selecting a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

Another innovative aspect of the subject matter described in this disclosure can be implemented in an apparatus for wireless communications at a UE. The apparatus may include a first interface, a second interface, and a processing system. The first interface may be configured to receive an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources. The processing system may be configured to select to monitor the first PDCCH candidate instead of the third PDCCH candidate as a result of a resource overlap between the first PDCCH candidate and the third PDCCH candidate. The processing system may be further configured to select a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources, select to monitor the first PDCCH candidate instead of the third PDCCH candidate as a result of a resource overlap between the first PDCCH candidate and the third PDCCH candidate, and select a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

Another innovative aspect of the subject matter described in this disclosure can be implemented in another apparatus for wireless communications at a UE. The apparatus may include means for receiving an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources, means for selecting to monitor the first PDCCH candidate instead of the third PDCCH candidate as a result of a resource overlap between the first PDCCH candidate and the third PDCCH candidate, and means for selecting a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

Another innovative aspect of the subject matter described in this disclosure can be implemented in a non-transitory computer-readable medium storing code for wireless communications at a UE. The code may include instructions executable by a processor to receive an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources, select to monitor the first PDCCH candidate instead of the third PDCCH candidate as a result of a resource overlap between the first PDCCH candidate and the third PDCCH candidate, and select a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

One innovative aspect of the subject matter described in this disclosure can be implemented in a method for wireless communications at a base station (BS). The method may include outputting an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources, selecting the first PDCCH candidate as a monitored PDCCH candidate instead of the third PDCCH candidate as a result of a resource overlap between the first PDCCH candidate and the third PDCCH candidate, selecting a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate, and outputting, over the first set of linked PDCCH candidates, the first PDCCH information and, over at least a subset of the second set of linked PDCCH candidates, the second PDCCH information in accordance with the selected first reference or the selected second reference, or both.

Another innovative aspect of the subject matter described in this disclosure can be implemented in an apparatus for wireless communications at a BS. The apparatus may include a first interface, a second interface, and a processing system. The first interface may be configured to output an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources. The processing system may be configured to select the first PDCCH candidate as a monitored PDCCH candidate instead of the third PDCCH candidate as a result of a resource overlap between the first PDCCH candidate and the third PDCCH candidate. The processing system may be further configured to select a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate. The first interface or the second interface may be configured to output, over the first set of linked PDCCH candidates, the first PDCCH information and, over at least a subset of the second set of linked PDCCH candidates, the second PDCCH information in accordance with the selected first reference or the selected second reference, or both.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to output an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources, select the first PDCCH candidate as a monitored PDCCH candidate instead of the third PDCCH candidate as a result of a resource overlap between the first PDCCH candidate and the third PDCCH candidate, select a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate, and output, over the first set of linked PDCCH candidates, the first PDCCH information and, over at least a subset of the second set of linked PDCCH candidates, the second PDCCH information in accordance with the selected first reference or the selected second reference, or both.

Another innovative aspect of the subject matter described in this disclosure can be implemented in another apparatus for wireless communications at a BS. The apparatus may include means for outputting an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources, means for selecting the first PDCCH candidate as a monitored PDCCH candidate instead of the third PDCCH candidate as a result of a resource overlap between the first PDCCH candidate and the third PDCCH candidate, means for selecting a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate, and means for outputting, over the first set of linked PDCCH candidates, the first PDCCH information and, over at least a subset of the second set of linked PDCCH candidates, the second PDCCH information in accordance with the selected first reference or the selected second reference, or both.

Another innovative aspect of the subject matter described in this disclosure can be implemented in a non-transitory computer-readable medium storing code for wireless communications at a BS. The code may include instructions executable by a processor to output an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources, select the first PDCCH candidate as a monitored PDCCH candidate instead of the third PDCCH candidate as a result of a resource overlap between the first PDCCH candidate and the third PDCCH candidate, select a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate, and output, over the first set of linked PDCCH candidates, the first PDCCH information and, over at least a subset of the second set of linked PDCCH candidates, the second PDCCH information in accordance with the selected first reference or the selected second reference, or both.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
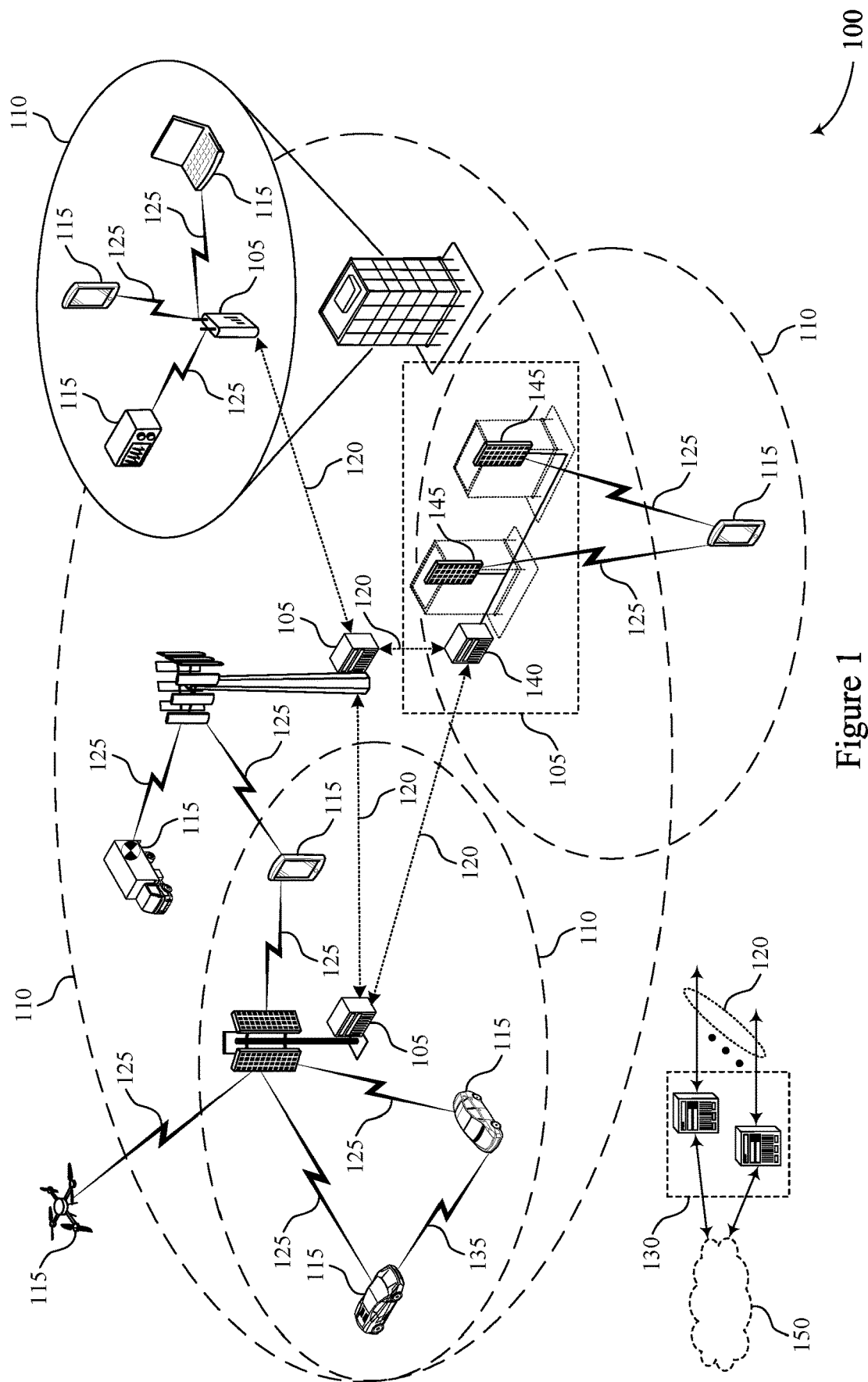
FIG. 1 illustrates an example of a wireless communications system that supports managing the selection of reference physical downlink control channel (PDCCH) candidates in deployments featuring PDCCH repetition with overlapping search space (SS) sets.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some systems, a base station (BS), or one or more components of a BS, may transmit downlink control information (DCI) to a user equipment (UE) over a downlink control channel, such as a physical downlink control channel (PDCCH), with repetition. For example, the BS, or one or more components of the BS, may transmit a same DCI over each of multiple PDCCH candidates that are linked for the repetition of the DCI. As such, the UE may monitor for the DCI over the multiple PDCCH candidates and, in some examples, may combine multiple received instances of the DCI prior to decoding (which may increase a likelihood for the UE to successfully decode the DCI). In such examples in which the UE receives multiple instances of the same DCI over the multiple PDCCH candidates, the UE and the BS may define a reference PDCCH candidate from which any scheduling information or scheduling restrictions obtained from the DCI are measured or defined.

In some examples, however, the UE may refrain from monitoring one or more PDCCH candidates of the multiple PDCCH candidates that are linked for the repetition of the DCI as a result of a resource conflict (such as due to conflicting resource assignments). For example, the BS may configure the UE with a first set of linked PDCCH candidates including a first PDCCH candidate and a second PDCCH candidate as well as a second set of linked PDCCH candidates including a third PDCCH candidate and a fourth PDCCH candidate and, if the first PDCCH candidate overlaps with the third PDCCH candidate in a same control resource set (CORESET) using a same set of control channel elements (CCEs), the UE may select to decode either the first PDCCH candidate or the third PDCCH candidate (and may drop the non-selected PDCCH candidate). The UE and the BS, however, may lack a well-defined procedure for defining which of the first PDCCH candidate or the third PDCCH candidate is the monitored PDCCH candidate and for defining whether the UE and the BS still consider the dropped PDCCH candidate as part of the PDCCH candidates that are linked for repetition. Such a lack of definitive behavior for the UE and the BS may result in the UE and the BS operating in accordance with different communication timelines if the UE and the BS select different reference PDCCH candidates, which may reduce a likelihood for successful communication between the UE and the BS.

In some implementations of the present disclosure, the UE and the BS, or one or more components of the BS, may maintain a mutual understanding as to which of the first PDCCH candidate or the third PDCCH candidate the UE and the BS may select as the monitored PDCCH candidate and how such selection may impact a linking between PDCCH candidates of the first set of linked PDCCH candidates and a linking between PDCCH candidates of the second set of linked PDCCH candidates. In some examples, for instance, the UE and the BS may select one of the first PDCCH candidate or the third PDCCH candidate as a monitored PDCCH candidate in accordance with a prioritization rule and may select one or more reference PDCCH candidates in accordance with a reference selection rule. In accordance with the prioritization rule, the UE and the BS may select to monitor the first PDCCH candidate or the third PDCCH candidate in connection with one or more of a search space (SS) set index associated with each of the first PDCCH candidate and the third PDCCH candidate, an SS set index associated with the PDCCH candidates that are linked to the first PDCCH candidate and the third PDCCH candidate (such as the second PDCCH candidate and the fourth PDCCH candidate, respectively), or a PDCCH candidate index associated with each of the first PDCCH candidate and the third PDCCH candidate index. Further, and in accordance with the reference selection rule, the UE and the BS may select a reference PDCCH candidate for one or both of the first set of linked PDCCH candidates or the second set of linked PDCCH candidates.

Particular implementations of the subject matter described in this disclosure can be implemented to realize one or more of the following potential advantages. For example, the described techniques may be implemented to maintain synchronization and mutual understanding between the UE and the BS, or one or more components of the BS, with respect to which PDCCH candidates of the first set of linked PDCCH candidates and the second set of linked PDCCH candidates are reference PDCCH candidates for the respective set. As such, the UE and the BS may communicate in accordance with a same communication timeline (as the UE and the BS may define any scheduling information of the DCI from same reference PDCCH candidates), which may increase a likelihood for successful communication between the UE and the BS, or between the UE and one or more components of the BS. Accordingly, the UE and the BS may achieve increased system capacity, greater spectral efficiency, higher data rates, higher reliability, and lower latency, among other benefits.

FIG. 1 illustrates an example of a wireless communications system 100 that supports managing the selection of reference PDCCH candidates in deployments featuring PDCCH repetition with overlapping SS sets. The wireless communications system 100 may include one or more BSs 105, one or more UEs 115, and a core network 130. In some implementations, the wireless communications system 100 may be a Long Term Evolution (LTE) network, an LTE-Advanced (LTE-A) network, an LTE-A Pro network, or a New Radio (NR) network. In some implementations, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or other interface) either directly (for example, directly between BSs 105), or indirectly (for example, via core network 130), or both. In some implementations, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other implementations.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other implementations, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some implementations (for example, in a carrier aggregation configuration), a carrier also may have acquisition signaling or control signaling that coordinates operation for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The quantity of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some implementations, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some implementations, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some implementations, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other implementations.

In some implementations, a BS 105 may be movable and therefore provide communication coverage for a moving geographic coverage area 110. In some implementations, different geographic coverage areas 110 associated with different technologies may overlap, but the different geographic coverage areas 110 may be supported by the same BS 105. In some other implementations, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some implementations, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some implementations, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some implementations, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some implementations, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some implementations, groups of the UEs 115 communicating via D2D communications may utilize a one-to-many (1-M) system in which each UE 115 transmits to every other UE 115 in the group. In some implementations, a BS 105 facilitates the scheduling of resources for D2D communications. In some other implementations, D2D communications are carried out between the UEs 115 without the involvement of a BS 105.

In some implementations, the D2D communication link 135 may be an example of a communication channel, such as a sidelink communication channel, between vehicles (for example, UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity

140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some implementations, the wireless communications system 100 may support millimeter wave (mmW) communications between the UEs 115 and the BSs 105, and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some implementations, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other transmissions.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (for example, a direction associated with the receiving device, such as a UE 115). In some implementations, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some implementations, a device may support same-slot HARQ feedback, where the device may provide HARQ feedback in a specific slot for data received in a previous symbol in the slot. In some other implementations, the device may provide HARQ feedback in a subsequent slot, or according to some other time interval.

In some implementations, a UE 115 and a BS 105, or one or more components of the BS 105, may support PDCCH repetition such that the BS 105 may transmit multiple instances of a same control information (such as a same DCI or a same PDCCH information) over multiple PDCCH candidates. A PDCCH candidate may refer to a resource location (for example, a time and frequency resource location) over which the BS 105 may transmit control information to the UE 115 and, in some examples, the BS 105 may "link" multiple PDCCH candidates together to indicate, to the UE 115, that the linked PDCCH candidates carry repeats of the same control information. Accordingly, the UE 115 may monitor for the linked PDCCH candidates to receive the control information from the BS 105. In some implementations, the BS 105 may link PDCCH candidates of different SS sets or of different monitoring occasions as a result of a linking of the different SS sets or the different monitoring occasions (for example, if two SS sets or two monitoring occasions are linked, PDCCH candidates within such two linked SS sets or such two linked monitoring occasions also may be linked).

In some implementations, however, the UE 115 may select to monitor a subset of the linked PDCCH candidates. For example, the UE 115 may receive, from the BS 105, an indication of a first set of linked PDCCH candidates including a first PDCCH candidate and a second PDCCH candidate and an indication of a second set of linked PDCCH candidates including a third PDCCH candidate and a fourth PDCCH candidate and the UE 115 may select to monitor a subset of either the first set of linked PDCCH candidates or the second set of linked PDCCH candidates if a PDCCH candidate of the first set overlaps with (for example, uses a same set of resources as) a PDCCH candidate of the second set. In some implementations, for instance, the first PDCCH candidate and the third PDCCH candidate may occupy a same set of resources and the UE 115 may accordingly select to monitor one of the first PDCCH candidate or the third PDCCH candidate (as the UE 115 may be unable to decode two PDCCH candidates occupying a same set of resources).

In some implementations, and as a result of the first PDCCH candidate and the third PDCCH candidate occupying the same set of resources, the UE 115 and the BS 105, or one or more components of the BS 105, may select the first PDCCH candidate as a monitored PDCCH candidate instead of the third PDCCH candidate in accordance with a mutually understood prioritization rule. Upon selecting the first PDCCH candidate as the monitored PDCCH candidate (and dropping the third PDCCH candidate or otherwise classifying the third PDCCH candidate as an unmonitored PDCCH candidate), the UE 115 and the BS 105, or one or more components of the BS 105, may additionally employ a mutually understood reference selection rule (which may be equivalently referred to as a reference PDCCH candidate selection rule) to select a first reference PDCCH candidate for the first set of linked PDCCH candidates or a second reference PDCCH candidate for the second set of linked PDCCH candidates, or both.

In some implementations, the selecting of the first PDCCH candidate as the monitored PDCCH candidate instead of the third PDCCH candidate may trigger the employing of the reference selection rule (for example, the UE 115 and the BS 105 may reserve the described reference selection rule for scenarios in which two PDCCH candidates from different sets of linked PDCCH candidates occupy a same set of resources). As a result of employing the mutually understood reference selection rule, the UE 115 and the BS 105, or one or more components of the BS 105, may both select a same reference for one or both of the first set of linked PDCCH candidates or the second set of linked PDCCH candidates and may communicate with each other in accordance with a communication timeline that is defined as a function of a time domain property or a frequency domain property of the selected references.

As described herein, a BS 105 may include components that are located at a single physical location or components located at various physical locations. In examples in which the BS 105 includes components that are located at various physical locations, the various components may each perform various functions such that, collectively, the various components may achieve functionality that is similar to a BS 105 that is located at a single physical location. As such, a BS 105 described herein may equivalently refer to a stand-alone BS 105 or a BS 105 including components that are located at various physical locations. In some implementations, such a BS 105 including components that are located at various physical locations may be referred to as or may be associated with a disaggregated radio access network (RAN) architecture, such as an Open RAN (O-RAN) or Virtualized RAN (VRAN) architecture.

Figure 2:
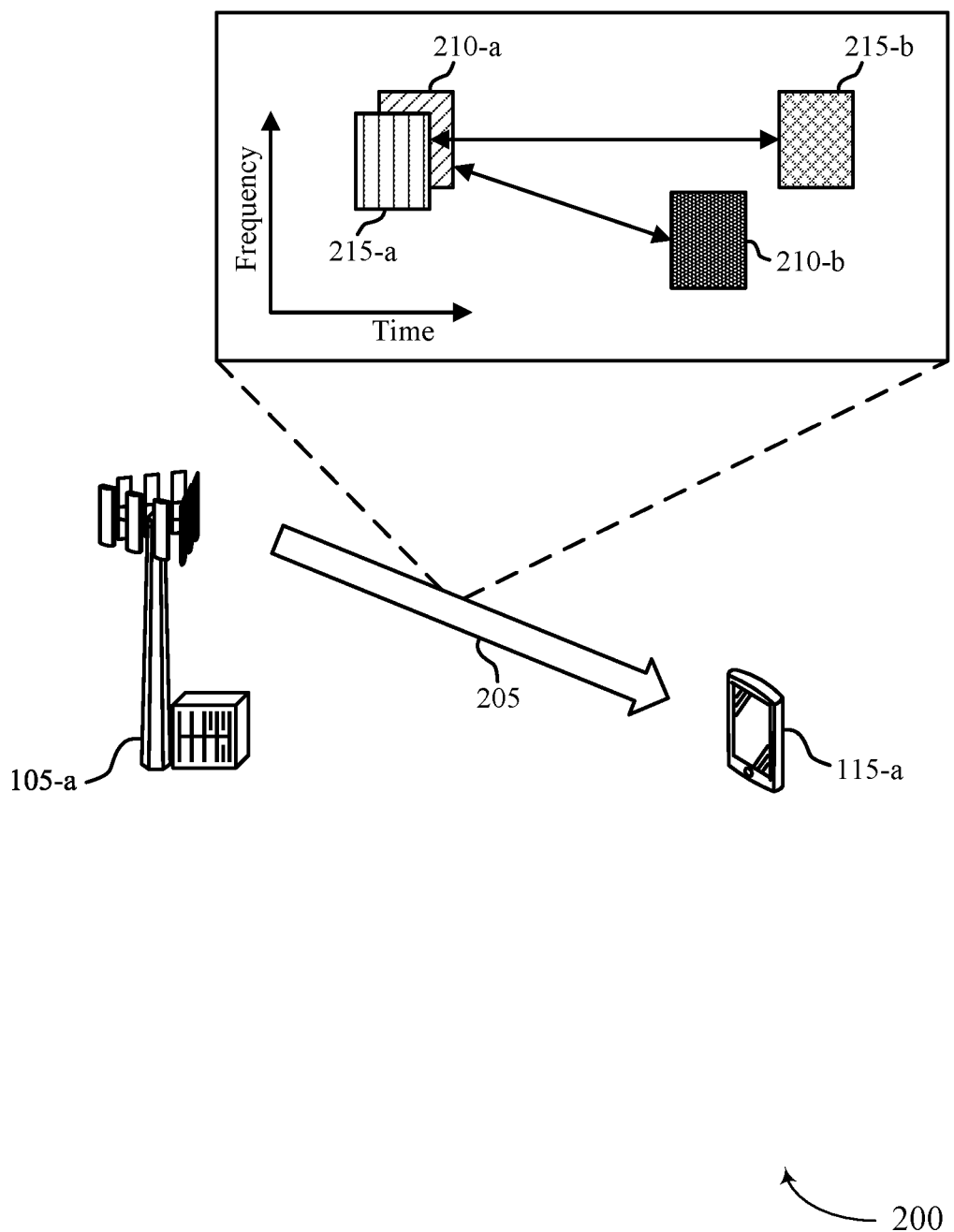
FIG. 2 illustrates an example signaling diagram that supports managing the selection of reference PDCCH candidates in deployments featuring PDCCH repetition with overlapping SS sets.

FIG. 2 illustrates an example signaling diagram 200 that supports managing the selection of reference PDCCH candidates in deployments featuring PDCCH repetition with overlapping SS sets. The signaling diagram 200 may implement or be implemented to realize aspects of the wireless communications system 100. For example, the signaling diagram 200 may include a UE 115-*a* and a BS 105-*a*, or one or more components of the BS 105-*a*, which may be examples of corresponding devices described herein, including with reference to FIG. 1. In some examples, the UE 115-*a* and the BS 105-*a* may employ techniques for prioritizing between PDCCH candidates belonging to different sets of linked PDCCH candidates that occupy a same set of resources and for selecting a reference PDCCH candidate for each of the different sets of linked PDCCH candidates.

For example, the UE 115-*a* and the BS 105-*a* may support PDCCH repetition according to which the BS 105-*a* may transmit a same DCI to the UE 115-*a* over two or more PDCCH candidates. For instance, the BS 105-*a* may transmit a same first DCI over a PDCCH candidate 210-*a* and a PDCCH candidate 210-*b* and, as such, the UE 115-*a* and the BS 105-*a* may designate the PDCCH candidate 210-*a* and the PDCCH candidate 210-*b* as linked PDCCH candidates 210 (such as a first set of linked PDCCH candidates 210) as a result of the PDCCH candidate 210-*a* and the PDCCH candidate 210-*b* conveying the same first DCI. Similarly, the BS 105-*a* also may transmit a same second DCI over a PDCCH candidate 215-*a* and a PDCCH candidate 215-*b* and, as such, the UE 115-*a* and the BS 105-*a* may designate the PDCCH candidate 215-*a* and the PDCCH candidate 215-*b* as linked PDCCH candidates 215 (such as a second set of linked PDCCH candidates 215) as a result of the PDCCH candidate 215-*a* and the PDCCH candidate 215-*b* conveying the same second DCI. Additional details relating to such a linking of PDCCH candidates conveying a same DCI are described herein, including with reference to FIG. 3.

In some aspects, the BS 105-*a* may explicitly link the PDCCH candidate 210-*a* with the PDCCH candidate 210-*b* and may explicitly link the PDCCH candidate 215-*a* with the PDCCH candidate 215-*b* (for example, the BS 105-*a* may transmit indications of the respective linking between PDCCH candidates to the UE 115-*a*) such that the UE 115-*a* may be aware of or otherwise recognize that the PDCCH candidate 210-*a* and the PDCCH candidate 210-*b* belong to the first set of linked PDCCH candidates 210 and that the PDCCH candidate 215-*a* and the PDCCH candidate 215-*b* belong to the second set of linked PDCCH candidates 215. As such, the UE 115-*a* may know or otherwise be aware of the linking of the PDCCH candidates before decoding the PDCCH candidates.

In examples in which the UE 115-*a* and the BS 105-*a* employ PDCCH repetition, the UE 115-*a* may define any scheduling information or scheduling restrictions obtained from (or that are otherwise relevant to) the DCI based on a function of resources of the detected DCI. In other words, the scheduling information or scheduling restrictions associated with the DCI may be a function of a time domain property or a frequency domain property of the detected DCI. Such a detected DCI may refer to DCI that is actually decoded by the UE 115-*a* and, if the UE 115-*a* receives the DCI over multiple PDCCH candidates, the UE 115-*a* may select a PDCCH candidate from a set of linked PDCCH candidates over which the UE 115-*a* monitors as a reference PDCCH candidate. Accordingly, the UE 115-*a* may use a time domain property or a frequency domain property of the selected reference PDCCH candidate to define the scheduling information or scheduling restrictions associated with the DCI.

Various procedures may rely on the selection of the reference PDCCH candidate and the use of the reference PDCCH candidate to define the scheduling information or scheduling restrictions associated with the DCI. For example, in a first procedure, the UE 115-*a* may use a starting CCE index and a quantity of CCEs in a CORESET of the reference PDCCH candidate to identify or otherwise determine a physical uplink control channel (PUCCH) resource for HARQ-ACK feedback if a corresponding PUCCH resource set has a size (a quantity of PUCCH resources within the PUCCH resource set) larger than eight. In some examples, for instance, the UE 115-*a* may identify or otherwise determine the PUCCH resource according to a PUCCH resource indicator (PRI) field of three bits (which may thus indicate or differentiate between up to eight PUCCH resources). As such, for a PUCCH resource set having a size larger than eight, the UE 115-*a* may use the starting CCE index and the number of CCEs in the CORSET of the reference PDCCH (or of a scheduling PDCCH in examples in which the BS 105-*a* transmits a single instance of the DCI) as supplementary "bits" or degrees of freedom to identify the PUCCH resource. In this first procedure, the UE 115-*a* may select the reference PDCCH candidate in accordance with which of a linked and monitored set of PDCCH candidates has a lowest CORESET identifier (ID) or, if the linked and monitored PDCCH candidates have a same CORESET ID, in accordance with which of the linked and monitored PDCCH candidates has a lowest SS ID.

Additionally, or alternatively, in a second procedure, the UE 115-*a* may use a starting symbol of the reference PDCCH candidate to define during which symbols the UE 115-*a* expects to receive a physical downlink shared channel (PDSCH) transmission scheduled by the DCI carried by the linked PDCCH candidates. For example, if a PDSCH with mapping Type B is scheduled by DCI in PDCCH candidates that are linked for repetition, the UE 115-*a* may not expect that a first (for example, initial) symbol of the PDSCH to start earlier than the starting symbol of the reference PDCCH candidate. In other words, if the UE 115-*a* receives a configuration of ReferenceofSLIV-ForDCIFormat1_2 and if the UE 115-*a* receives the PDSCH scheduled by a DCI format 1_2 with CRC scrambled by C-RNTI, MCS-C-RNTI, or CS-RNTI with K0=0, the UE 115-*a* and the BS 105-*a* may define a starting symbol S of the PDSCH relative to the starting symbol S0 of the reference PDCCH candidate. In this second procedure, the UE 115-*a* may select the reference PDCCH candidate in accordance with which of the linked and monitored PDCCH candidates has a later (or latest) starting symbol relative to a remainder of the linked and monitored PDCCH candidates.

Additionally, or alternatively, in a third procedure, the UE 115-*a* may define a scheduling offset and a quasi-colocation (QCL) timer relative to the reference PDCCH candidate and the UE 115-*a* may select a QCL assumption or relation for a scheduled PDSCH or a channel state information (CSI) reference signal (CSI-RS) in accordance with whether the scheduling offset is less than or greater than the QCL timer. Such use of the reference PDCCH candidate for selecting a QCL assumption for a scheduled PDSCH or CSI-RS is illustrated by and described in more detail with reference to FIG. 4. Additionally, or alternatively, in a fourth procedure, the UE 115-*a* may use a last symbol of the reference PDCCH candidate to define a physical uplink shared channel (PUSCH) processing timeline (which may be referred to as an N2 timeline) and a CSI computation timeline (which may be referred to as a Z timeline). In this fourth procedure, the UE 115-*a* may select the reference PDCCH candidate in accordance with which of the linked and monitored PDCCH candidates is a last PDCCH candidate (for example, a last PDCCH repetition of the DCI).

Additionally, or alternatively, in a fifth procedure, the UE 115-*a* may define a downlink assignment index (DAI) relative to a monitoring occasion of the reference PDCCH candidate. In this fifth procedure, the UE 115-*a* may select the reference PDCCH candidate according to which of the linked and monitored PDCCH candidates is an earlier (or earliest) PDCCH candidate relative to a remainder of the linked and monitored PDCCH candidates. Such use of the reference PDCCH candidate for setting a DAI is illustrated by and described in more detail with reference to FIG. 5.

Additionally, or alternatively, in a sixth procedure, the UE 115-*a* may select a QCL assumption for a scheduled PDSCH based on a CORESET with a lower ID among the CORE-SETs associated with the linked PDCCH candidates if a transmission configuration indicator (TCI) field is absent from DCI and if the scheduling offset (as measured from the reference PDCCH candidate) is equal to or greater than a time duration of a configured timeDurationForQCL parameter. In other words, if the UE 115-*a* receives DCI (carried by the PDCCH candidates that are linked for repetition) scheduling the PDSCH, if the TCI field is absent from the DCI, and if the scheduling offset between the reference PDCCH candidate and the scheduled PDSCH is equal to or greater than timeDurationForQCL, the UE 115-*a* may select the QCL assumption for the PDSCH using the CORESET having the lowest ID of CORESETs associated with the linked PDCCH candidates. In this sixth procedure, the UE 115-*a* may select, as the reference PDCCH candidate, the PDCCH candidate from the linked and monitored PDCCH candidates associated with the CORESET having the lowest ID.

Additionally, or alternatively, in a seventh procedure, the UE 115-*a* and the BS 105-*a* may rate-match a PDSCH scheduled by the DCI carried over the linked PDCCH candidates around the linked PDCCH candidates if the PDSCH has a starting symbol that is the same as or later than a first symbol of the reference PDCCH candidate. In this seventh procedure, the UE 115-*a* may select the reference PDCCH candidate in accordance with which of the linked and monitored PDCCH candidates has a later (or latest) starting symbol relative to a remainder of the linked and monitored PDCCH candidates. Such a rate-matching of the PDSCH around the set of linked PDCCH candidates if the PDSCH has a starting symbol that is the same as or later than the first symbol of the reference PDCCH candidate is illustrated by and described in more detail with reference to FIG. 6.

As such, for each or for any combination of such various procedures, the UE 115-*a* and the BS 105-*a* may define a communication timeline in accordance with (or with reference to) the selected reference PDCCH candidate. In some examples, however, ambiguity may potentially arise due to the BS 105-*a* lacking awareness or insight into which PDCCH candidates are actually decoded by the UE 115-*a* and a lack of a procedure or rule for reference PDCCH candidate selection in examples in which the UE 115-*a* drops one or more of the linked PDCCH candidates. For example, as described in each of the various procedures that rely on or use a reference PDCCH candidate, the UE 115-*a* may define the scheduling information or restrictions that are obtained from or based on the DCI as a function of resources occupied by the reference PDCCH candidate, which the UE 115-*a* may select from PDCCH candidates that are actually monitored by the UE 115-*a*. In other words, the scheduling information or restrictions may be a function of the resources of the detected DCI (for example, the DCI decoded by the UE 115-*a*). As such, if the UE 115-*a* drops one of the linked PDCCH candidates, ambiguity or inconsistency may arise between the UE 115-*a* and the BS 105-*a* as to which PDCCH candidate is the reference PDCCH candidate if the BS 105-*a* is unaware of which PDCCH candidates 210 the UE 115-*a* drops and if the UE 115-*a* and the BS 105-*a* lack a mutually understood procedure for accounting for such PDCCH candidate dropping.

In some examples, the UE 115-*a* may refrain from monitoring for a PDCCH candidate as a result of two PDCCH candidates occupying a same set of resources. For example, and as illustrated in FIG. 2, the PDCCH candidate 210-*a* and the PDCCH candidate 215-*a* may occupy a same set of resources and, as such, the UE 115-*a* may select to decode one of the PDCCH candidate 210-*a* or the PDCCH candidate 215-*a* (and not both). In some aspects, for example, if the PDCCH candidate 210-*a* overlaps with the PDCCH candidate 215-*a* in a same CORESET on an active downlink BWP for a same serving cell using a same set of CCEs, if the PDCCH candidates have identical scrambling, and if corresponding DCI formats for the PDCCH candidates have a same size, the UE 115-*a* may select to monitor the PDCCH candidate associated with a relatively smaller SS set index (and likewise select to refrain from monitoring for the PDCCH candidate associated with a relatively larger SS set index). In other words, the UE 115-*a* may refrain from monitoring (or not count towards monitoring) a PDCCH candidate for a search space $s_j$ using a set of CCEs in a CORESET on an active downlink BWP for a serving cell if there is another PDCCH candidate for a search space $s_i < s_j$ in the CORESET on the active downlink BWP for the serving cell using a same set of CCEs (if the two PDCCH candidates have identical scrambling and if DCI formats corresponding to the two PDCCH candidates have a same size).

In such examples in which the PDCCH candidate 210-*a* (which is linked with the first set of linked PDCCH candidates 210) and the PDCCH candidate 215-*a* (which is linked with the second set of linked PDCCH candidates 215) occupy the same set of CCEs, the UE 115-*a* may monitor over the set of CCEs and detect a DCI corresponding to either the PDCCH candidate 210-*a* or the PDCCH candidate 215-*a* (depending on for which of the PDCCH candidate 210-*a* or the PDCCH candidate 215-*a* the UE 115-*a* monitors). In some examples, and as a result of the UE 115-*a* detecting one DCI over the set of CCEs and as a result of a lack of a mutually understood procedure for managing linked PDCCH candidates, ambiguity may arise between the UE 115-*a* and the BS 105-*a* as to whether the UE 115-*a* interprets the detected DCI as corresponding to the first set of linked PDCCH candidates 210 or as corresponding to the second set of linked PDCCH candidates 215.

For example, because the PDCCH candidate 210-*a* and the PDCCH candidate 215-*a* occupy the same set of CCEs and because such PDCCH candidates are linked with different sets of PDCCH candidates, the UE 115-*a* may potentially interpret the detected DCI as corresponding to the first set of linked PDCCH candidates 210 while the BS 105-*a* selects (for example, assumes or expects) that the DCI detected by the UE 115-*a* corresponds to the second set of linked PDCCH candidates 215. As such, the UE 115-*a* and the BS 105-*a* may have different understandings as to which set of linked PDCCH candidates the detected DCI corresponds, which may result in the UE 115-*a* and the BS 105-*a* selecting different reference PDCCH candidates (and likewise assuming, calculating, or determining different scheduling information) for one or both of the first set of linked PDCCH candidates 210 or the second set of linked PDCCH candidates 215.

Accordingly, in some implementations, the UE 115-*a* and the BS 105-*a* may employ one or more mutually understood rules or procedures for prioritizing a PDCCH candidate and for selecting a reference PDCCH candidate for one or both of the different sets of linked PDCCH candidates in examples in which the PDCCH candidate 210-*a* and the PDCCH candidate 215-*a* use a same set of resources (such as a same set of CCEs). For example, the UE 115-*a* and the BS 105-*a* may employ a mutually understood prioritization rule for selecting to monitor one of the PDCCH candidate 210-*a* or the PDCCH candidate 215-*a* and may employ a mutually understood reference PDCCH selection rule for selecting a first reference PDCCH candidate for the first set of linked PDCCH candidates 210 or for selecting a second reference PDCCH candidate for the second set of linked PDCCH candidates 215, or both. In some aspects, such a specifying of a behavior for the UE 115-*a* and the BS 105-*a* in accordance with the one or more mutually understood rules or procedures may reduce ambiguity between the UE 115-*a* and the BS 105-*a* for reference PDCCH candidate selection which may, in turn, increase a likelihood for successful communication between the UE 115-*a* and the BS 105-*a*.

In some examples, for instance, the UE 115-*a* and the BS 105-*a* may employ a mutually understood rule or procedure (in accordance with a standard or defined configuration) according to which the UE 115-*a* and the BS 105-*a* may not expect two PDCCH candidates associated with different sets of linked PDCCH candidates to overlap with each other. In some other examples, the UE 115-*a* and the BS 105-*a* may allow such an overlapping of two PDCCH candidates associated with different sets of linked PDCCH candidates and may employ a prioritization rule for selecting which of the overlapping PDCCH candidates the UE 115-*a* monitors.

In such examples, the UE 115-*a* and the BS 105-*a* may, in some implementations, employ a reference PDCCH candidate selection rule that is triggered by or is otherwise aligned with the prioritization rule. Alternatively, in some other implementations, the UE 115-*a* and the BS 105-*a* may employ a reference PDCCH candidate selection rule regardless of the prioritization rule. In such implementations in which the reference PDCCH candidate selection rule is transparent to the prioritization rule, the UE 115-*a* may select a reference PDCCH candidate for one or both of the first set of linked PDCCH candidates 210 or the second set of linked PDCCH candidates 215 or may select a reference PDCCH candidate for a superset (for example, a combination) of PDCCH candidates from both the first set of linked PDCCH candidates 210 and the second set of linked PDCCH candidates 215. Additional details relating to such mutually understood prioritization and reference PDCCH candidate selection rules or procedures are described herein, including with reference to FIG. 7.

Figure 3:
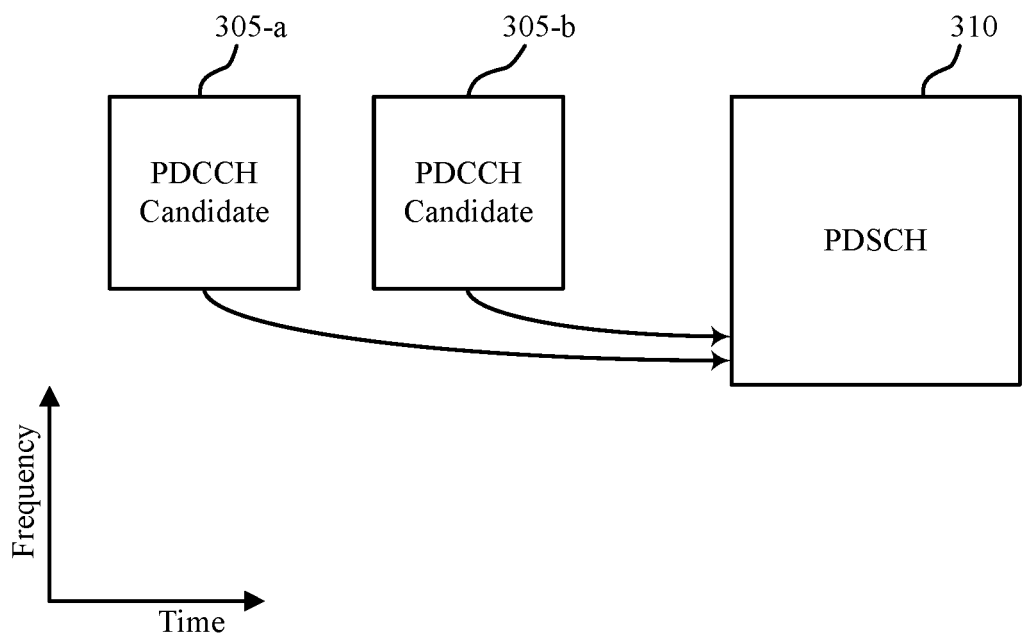
FIGS. 3-6 illustrate example communication timelines that support managing the selection of reference PDCCH candidates in deployments featuring PDCCH repetition with overlapping SS sets.

FIG. 3 illustrates an example communication timeline 300 that supports managing the selection of reference PDCCH candidates in deployments featuring PDCCH repetition with overlapping SS sets. The communication timeline 300 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may support PDCCH repetition in which the BS 105 transmits, to the UE 115, multiple instances of a same DCI over multiple PDCCH candidates 305 of a set of linked PDCCH candidates 305.

For example, the BS 105 may configure the set of linked PDCCH candidates 305, including a PDCCH candidate 305-*a* and a PDCCH candidate 305-*b*, for PDCCH repetition such that each of the PDCCH candidate 305-*a* and the PDCCH candidate 305-*b* includes a same DCI. In some examples, the BS 105 may transmit DCI over both the PDCCH candidate 305-*a* and the PDCCH candidate 305-*b* that schedules a PDSCH transmission 310 (for example, a downlink transmission from the BS 105 to the UE 115 over a PDSCH). Further, although shown in FIG. 2 as transmitting the PDCCH candidate 305-*a*, the PDCCH candidate 305-*b*, and the PDSCH transmission 310 in chronological order over a same or similar frequency band, the BS 105 may similarly transmit the linked PDCCH candidates 305 and the PDSCH transmission 310 in any order or over any one or more frequency bands without exceeding the scope of the present disclosure.

In some aspects, to convey the same DCI over the linked set of PDCCH candidates 305, the BS 105 may repeat a same set of coded bits in each of the linked PDCCH candidates 305. Further, the BS 105 may transmit each of the set of linked PDCCH candidates 305 (each repetition of the DCI) using a same number of CCEs. Accordingly, each linked PDCCH candidate 305 may correspond to a same DCI payload. Further, in some examples, the BS 105 may link PDCCH candidates 305 in different SS sets (which may be associated with corresponding CORESETs) for repetition. In such examples, the BS 105 may transmit the PDCCH candidate 305-*a* and the PDCCH candidate 305-*b* in different SS sets (which may correspond to or otherwise be associated with different CORESETs).

If the BS 105 transmits the same DCI over the PDCCH candidate 305-*a* and the PDCCH candidate 305-*b*, the UE 115 may decode the DCI in the PDCCH candidate 305-*a*, may decode the DCI in the PDCCH candidate 305-*b*, or may decode the DCI in both the PDCCH candidate 305-*a* and the PDCCH candidate 305-*b*. In examples in which the UE 115 decodes the DCI carried by both the PDCCH candidate 305-*a* and the PDCCH candidate 305-*b*, the UE 115 may, in some examples, employ a soft-combining technique as part of a decoding procedure for the DCI. For example, the UE 115 may soft-combine the DCI received over the PDCCH candidate 305-*a* and the DCI received over the PDCCH candidate 305-*b* to obtain a combination of the two instances of the DCI.

In some examples, such as in examples in which the UE 115 incorrectly receives a portion of the DCI over the PDCCH candidate 305-*a* or the PDCCH candidate 305-*b*, or both, the UE 115 may obtain a more complete or accurate version of the DCI as a result of employing the soft-combining technique. For instance, the UE 115 may receive a first portion of the DCI over the PDCCH candidate 305-*a* and a second portion of the DCI over the PDCCH candidate 305-*b* (even though the BS 105-*a* may transmit the full DCI over both the PDCCH candidate 305-*a* and the PDCCH candidate 305-*b*), and may obtain a more complete version of the DCI as a result of combining the first portion and the second portion. Such a first portion of the DCI and a second portion of the DCI may include different information or may include at least partially overlapping information. The UE 115 may decode the combination of the two instances of the DCI and, as such, may experience a greater likelihood for successfully decoding the DCI and receiving the PDSCH transmission 310.

Figure 4:
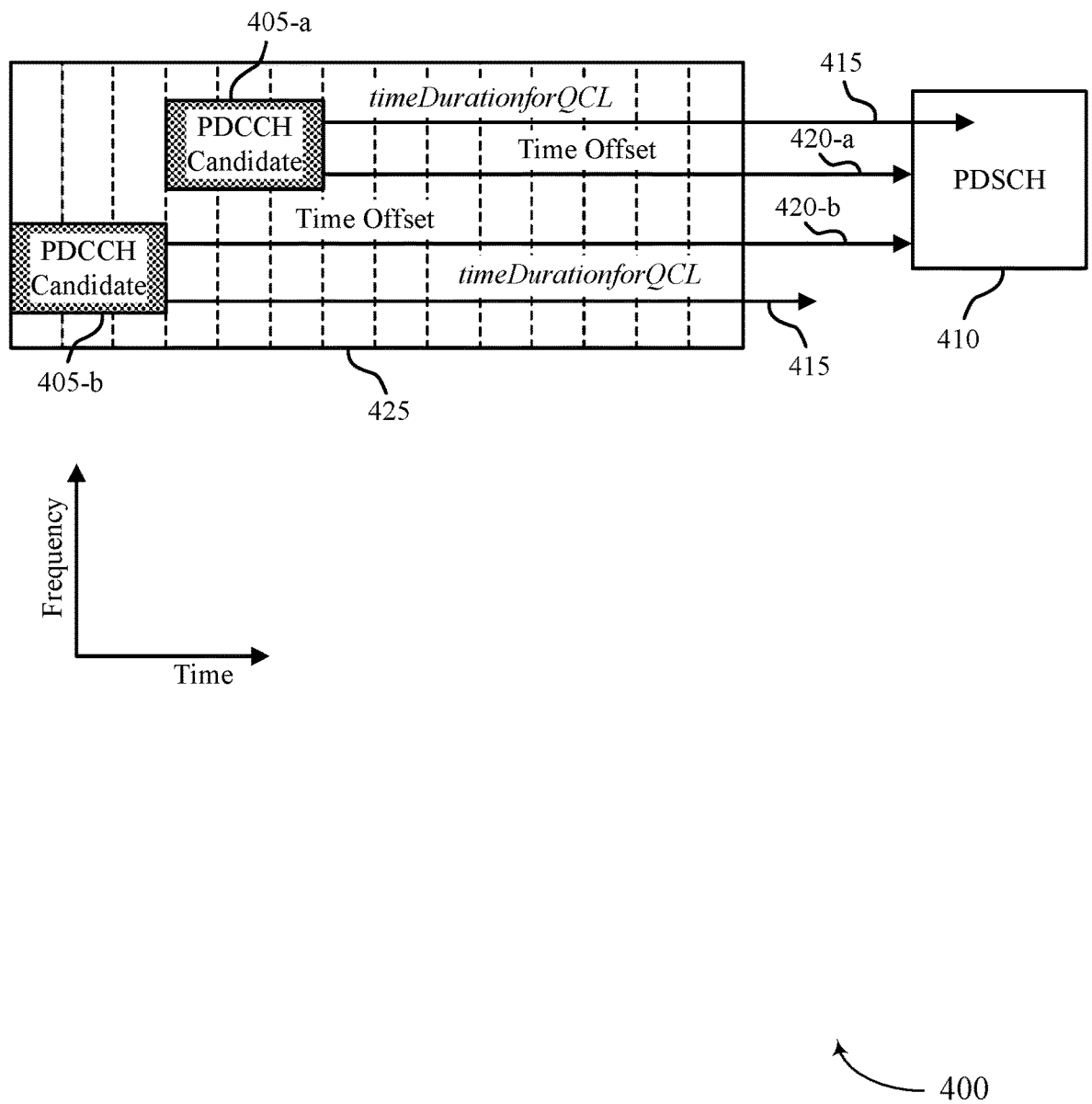

FIG. 4 illustrates an example communication timeline 400 that supports managing the selection of reference PDCCH candidates in deployments featuring PDCCH repetition with overlapping SS sets. The communication timeline 400 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may communicate in accordance with the communication timeline 400 and may select a QCL assumption for a PDSCH transmission 410 (or a CSI-RS) based on a timer measured from a reference PDCCH candidate for a set of linked PDCCH candidates 405.

For example, the UE 115 may receive a configuration of the set of linked PDCCH candidates 405 within a slot 425 including a PDCCH candidate 405-a and a PDCCH candidate 405-b, and each of the PDCCH candidate 405-a and the PDCCH candidate 405-b may include or convey a same DCI or PDCCH information. In some examples, the set of linked PDCCH candidates 405 may include or convey scheduling information associated with the PDSCH transmission 410 or a CSI-RS. In such examples in which the set of linked PDCCH candidates 405 schedule the PDSCH transmission 410 or the CSI-RS, the UE 115 may select or otherwise determine the QCL assumption for the PDSCH transmission 410 or the CSI-RS based on a timeDurationForQCL timer 415 and a time offset 420 as measured from a reference PDCCH candidate. In some aspects, the UE 115 and the BS 105 may select a later PDCCH candidate 405 (such as the PDCCH candidate 405-a) as the reference PDCCH candidate and, likewise, may measure the timeDurationForQCL timer 415 and the time offset 420-a relative to the PDCCH candidate 405-a.

In some examples, to select the QCL assumption for the PDSCH transmission 410, the UE 115 and the BS 105 may measure the time offset 420-a between the PDCCH candidate 405-a and the PDSCH transmission 410 and may determine whether the measured time offset 420-a is less than or greater than the timeDurationForQCL timer 415 (as also measured from the PDCCH candidate 405-a as a result of selecting the PDCCH candidate 405-a as the reference PDCCH candidate). For example, if the time offset 420-a is less than the timeDurationForQCL timer 415, the UE 115 and the BS 105 may select and use a default QCL assumption, such as a default beam, (for QCL-TypeD) for the PDSCH transmission 410.

In some scenarios, however, the UE 115 may refrain from monitoring one of the linked PDCCH candidates 405 and, as such, the UE 115 and the BS 105 may potentially select different PDCCH candidates 405 as a reference PDCCH candidate. For example, if the UE 115 drops the PDCCH candidate 405-a from a set of monitored PDCCH candidates 405, the UE 115 may select the PDCCH candidate 405-b as the reference PDCCH candidate (as the PDCCH candidate 405-b includes the DCI that is actually decoded by the UE 115) while the BS 105 may still select the PDCCH candidate 405-a as the reference PDCCH candidate. As a result of such ambiguity between the UE 115 and the BS 105, the UE 115 and the BS 105 may potentially select different QCL assumptions for the PDSCH transmission 410. For example, the UE 115 may select a first QCL assumption for the PDSCH transmission 410 as a result of determining that a time offset 420-b between the PDCCH candidate 405-b and the PDSCH transmission 410 is greater than the timeDurationForQCL timer 415 (as measured from the PDCCH candidate 405-b) while the BS 105 may select a second (and different) QCL assumption for the PDSCH transmission 410 as a result of determining that the time offset 420-a is less than the timeDurationForQCL timer 415 (as measured from the PDCCH candidate 405-a).

Accordingly, in some implementations, the UE 115 and the BS 105 may employ mutually understood rules or procedures for maintaining a common understanding of the set of linked PDCCH candidates 405 and for selecting, for the commonly understood set of linked PDCCH candidates 405, a common or same reference PDCCH candidate. As such, in some examples, the UE 115 and the BS 105 may select a same QCL assumption for the scheduled PDSCH transmission 410 (or for a scheduled CSI-RS), which may increase a likelihood for successful communication between the UE 115 and the BS 105. Such rules or procedures that are mutually understood between the UE 115 and the BS 105 are described in more detail with reference to FIG. 7.

Figure 5:
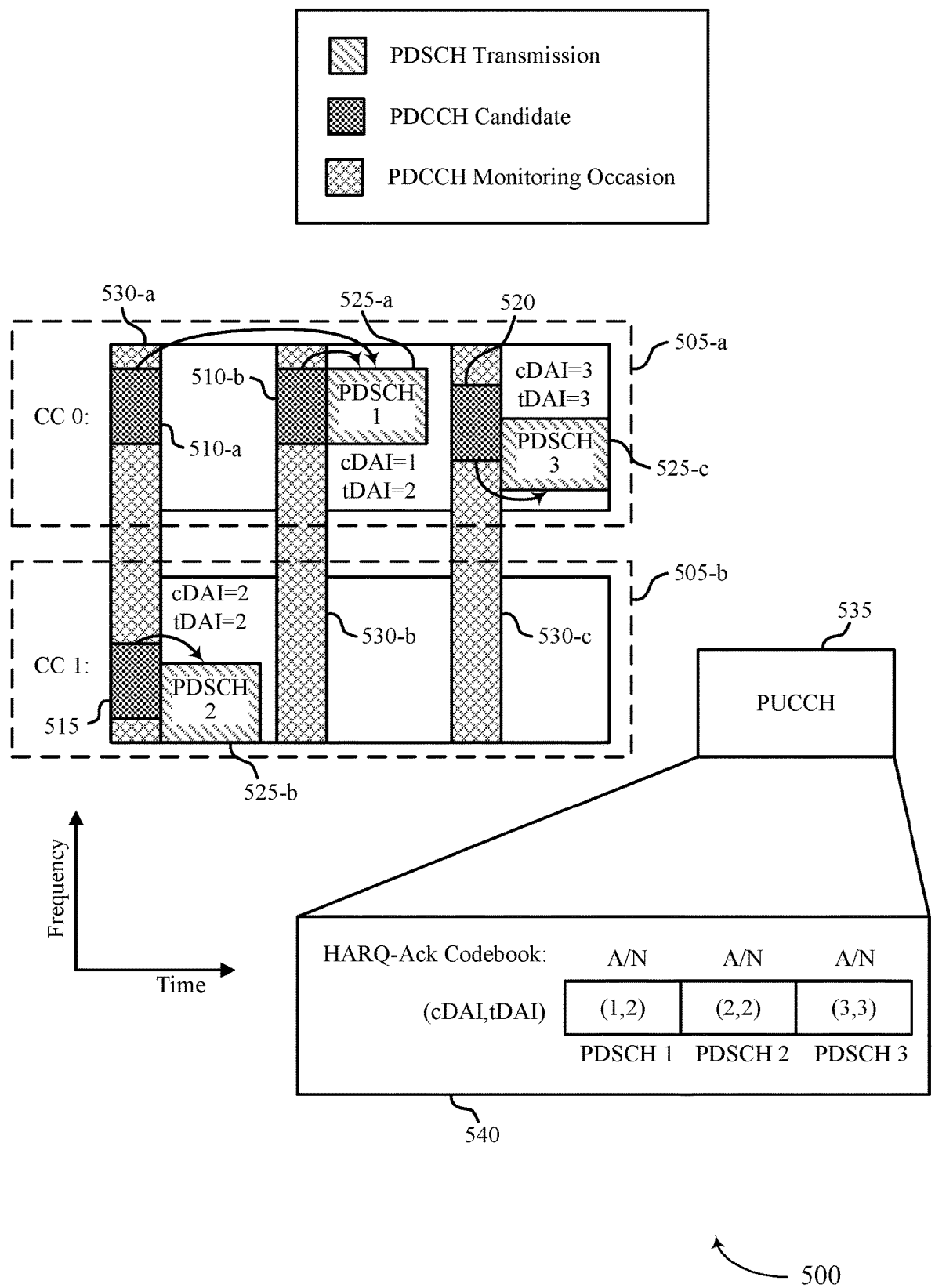

FIG. 5 illustrates an example communication timeline 500 that supports managing the selection of reference PDCCH candidates in deployments featuring PDCCH repetition with overlapping SS sets. The communication timeline 500 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may communicate in accordance with the communication timeline 500 and may construct a HARQ-ACK codebook 540 for one or more PDSCH transmissions 525 that are scheduled by DCI conveyed over various PDCCH candidates.

For example, the UE 115 may receive, from the BS 105 over a number of PDCCH candidates, DCI scheduling a number of PDSCH transmissions 525 and the UE 115 may transmit a PUCCH transmission 535 including the HARQ-ACK codebook 540 conveying HARQ-ACK feedback for each of the PDSCH transmissions 525. For example, the UE 115 may receive DCI for a PDSCH transmission 525-a over each of a linked set of PDCCH candidates 510 (including a PDCCH candidate 510-a and a PDCCH candidate 510-b), DCI for a PDSCH transmission 525-b over a PDCCH candidate 515, and DCI for a PDSCH transmission 525-c over a PDCCH candidate 520. As shown in the communication timeline 500, the UE 115 may monitor for the number of PDCCH candidates over multiple component carriers 505, including a component carrier 505-a (which may be associated with a first serving cell) and a component carrier 505-b (which may be associated with a second serving cell), and over multiple PDCCH monitoring occasions 530, including a PDCCH monitoring occasion 530-a, a PDCCH monitoring occasion 530-b, and a PDCCH monitoring occasion 530-c.

In some examples, the UE 115 may include, within the HARQ-ACK codebook 540, information relating to a downlink assignment index (DAI) for each of the received PDSCH transmissions 525. For example, the UE 115 may include a counter DAI (cDAI) and a total DAI (tDAI) in the HARQ-ACK codebook 540 for each of the PDSCH transmission 525-a (which may be referred to herein and illustrated as a PDSCH 1), the PDSCH transmission 525-b (which may be referred to herein and illustrated as a PDSCH 2), and the PDSCH transmission 525-*c* (which may be referred to herein and illustrated as a PDSCH 3). The UE 115 may calculate a cDAI for each PDSCH transmission 525 in accordance with a total number of serving cell PDCCH monitoring occasions 530 minus a number of linked PDCCH candidate pairs (for example, the UE 115 may calculate cDAI according to number of {serving cell, PDCCH monitoring occasion}—pair(s)). The UE 115 may similarly calculate a tDAI for each PDSCH transmission 525 and may update the tDAI from PDCCH monitoring occasion 530 to PDCCH monitoring occasion 530.

Further, in examples in which the PDSCH transmission 525 is scheduled by a set of linked PDCCH candidates (for example, as for the PDSCH transmission 525-*a* scheduled by the linked PDCCH candidates 510), the UE 115 and the BS 105 may calculate the cDAI or tDAI, or both, from a reference PDCCH candidate for the linked PDCCH candidates. In some examples, the UE 115 and the BS 105 may select the reference PDCCH candidate as an earlier PDCCH candidate. As such, in the context of the linked PDCCH candidates 510, the UE 115 and the BS 105 may select the PDCCH candidate 510-*a* as the reference PDCCH candidate for the linked PDCCH candidates 510 and, likewise, may calculate the cDAI or the tDAI, or both, for the PDSCH transmission 525-*a* using the PDCCH candidate 510-*a*.

In some scenarios, however, the UE 115 may refrain from monitoring one of the linked PDCCH candidates 510 and, as such, the UE 115 and the BS 105 may potentially select a different PDCCH candidate 510 as the reference PDCCH candidate. For example, if the UE 115 drops the PDCCH candidate 510-*a* from a set of monitored PDCCH candidates, the UE 115 may select the PDCCH candidate 510-*b* as the reference PDCCH candidate (as the PDCCH candidate 510-*b* includes the DCI that is actually decoded by the UE 115) while the BS 105 may still select the PDCCH candidate 510-*a* as the reference PDCCH candidate. As a result of such ambiguity between the UE 115 and the BS 105, the UE 115 and the BS 105 may potentially calculate different cDAI and tDAI values for the PDSCH transmission 525-*a* scheduled by the linked PDCCH candidates 510, which may result in incompatibility or confusion between the UE 115 and the BS 105 as to which PDSCH transmission 525 the UE 115 is referring to in the HARQ-ACK codebook 540.

Accordingly, in some implementations, the UE 115 and the BS 105 may employ mutually understood rules or procedures for maintaining a common understanding of the set of linked PDCCH candidates 510 and for selecting, from the commonly understood set of linked PDCCH candidates 510, a common reference PDCCH candidate. As such, in some examples, the UE 115 and the BS 105 may calculate same cDAI and tDAI values for the scheduled PDSCH transmission 525-*a*, which may increase a likelihood for successful communication between the UE 115 and the BS 105. Such rules or procedures that are mutually understood between the UE 115 and the BS 105 are described in more detail with reference to FIG. 7.

Figure 6:
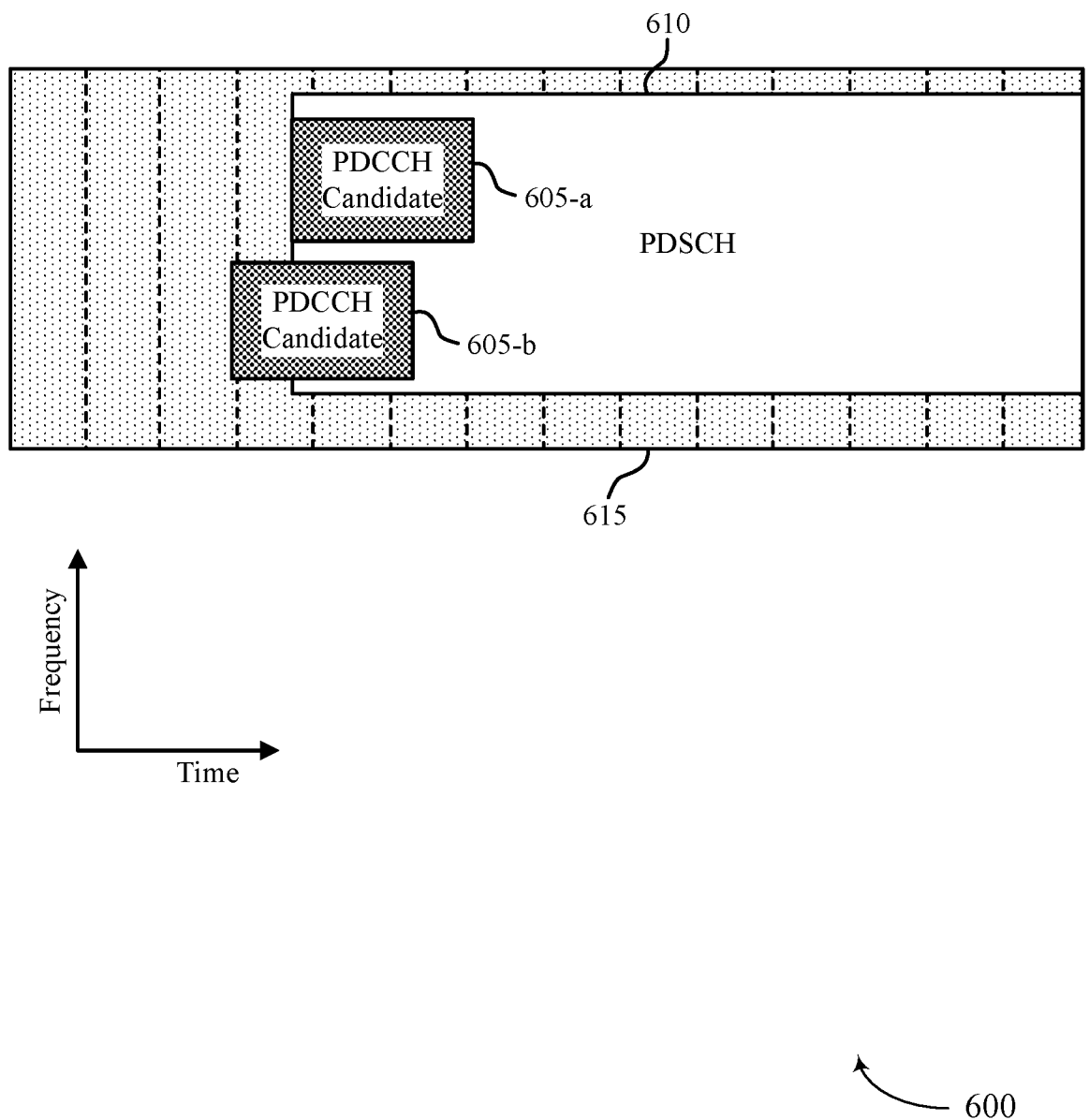

FIG. 6 illustrates an example communication timeline 600 that supports managing the selection of reference PDCCH candidates in deployments featuring PDCCH repetition with overlapping SS sets. The communication timeline 600 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may communicate in accordance with the communication timeline 600 and may rate-match a PDSCH transmission 610 around resources of a set of linked PDCCH candidates 605 if the PDSCH transmission 610 has a starting symbol in a same or later symbol than a reference PDCCH candidate of the set of linked PDCCH candidates 605.

For example, the UE 115 may receive a configuration of the set of linked PDCCH candidates 605 that are within a slot 615 including a PDCCH candidate 605-*a* and a PDCCH candidate 605-*b*, and each of the PDCCH candidate 605-*a* and the PDCCH candidate 605-*b* may include or convey a same DCI or PDCCH information. In some examples, the set of linked PDCCH candidates 605 may include or convey scheduling information associated with the PDSCH transmission 610. In such examples in which the set of linked PDCCH candidates 605 schedule the PDSCH transmission 610, the UE 115 and the BS 105 may rate-match the PDSCH transmission 610 around the resources occupied or used by the PDCCH candidates 605 if the PDSCH transmission 610 is scheduled for resources that overlap with the PDCCH candidates 605 and is scheduled for a symbol period that is in a same symbol period or a later symbol period than a first symbol period of a reference PDCCH candidate for the set of linked PDCCH candidates 605.

As such, the UE 115 and the BS 105 may select the reference PDCCH candidate for the set of linked PDCCH candidates 605 and may determine whether the PDSCH transmission 610 has a starting symbol that is the same as or later than the starting symbol of the reference PDCCH candidate. In some examples, the UE 115 and the BS 105 may select a later PDCCH candidate 605 (such as the PDCCH candidate 605-*a*) as the reference PDCCH candidate for the set of linked PDCCH candidates 605 and, accordingly, may determine that the PDSCH transmission 610 is scheduled for the same starting symbol as the starting symbol of the reference PDCCH candidate. As such, the UE 115 and the BS 105 may expect a rate-matching of the PDSCH transmission 610 around the resources occupied or used by the PDCCH candidates 605.

In some scenarios, however, the UE 115 may refrain from monitoring one of the linked PDCCH candidates 605 and, as such, the UE 115 and the BS 105 may potentially select a different PDCCH candidate 605 as the reference PDCCH candidate. For example, if the UE 115 drops the PDCCH candidate 605-*a* from a set of monitored PDCCH candidates, the UE 115 may select the PDCCH candidate 605-*b* as the reference PDCCH candidate (as the PDCCH candidate 605-*b* includes the DCI that is actually decoded by the UE 115) while the BS 105 may still select the PDCCH candidate 605-*a* as the reference PDCCH candidate. As a result of such ambiguity between the UE 115 and the BS 105, the UE 115 and the BS 105 may potentially reach different conclusions on whether or not the BS 105 transmits the PDSCH transmission 610 (and similarly whether the PDSCH transmission 610 is rate-matched around the resources occupied by the PDCCH candidates 605). For example, if the UE 115 refrains from monitoring the PDCCH candidate 605-*a*, the UE 115-*a* may be unaware that the BS 105 rate-matches the PDSCH transmission 610 around resources occupied by the PDCCH candidate 605-*a*.

Accordingly, in some implementations, the UE 115 and the BS 105 may employ mutually understood rules or procedures for maintaining a common understanding of the set of linked PDCCH candidates 605 and for selecting, from the commonly understood set of linked PDCCH candidates 605, a common reference PDCCH candidate. As such, in some examples, the UE 115 and the BS 105 may reach same conclusions as to whether the BS 105 rate-matches the PDSCH transmission 610 around the resources occupied by the PDCCH candidates 605, which may increase a likelihood for successful communication between the UE 115 and the BS 105. Such rules or procedures that are mutually understood between the UE 115 and the BS 105 are described in more detail with reference to FIG. 7.

Figure 7:
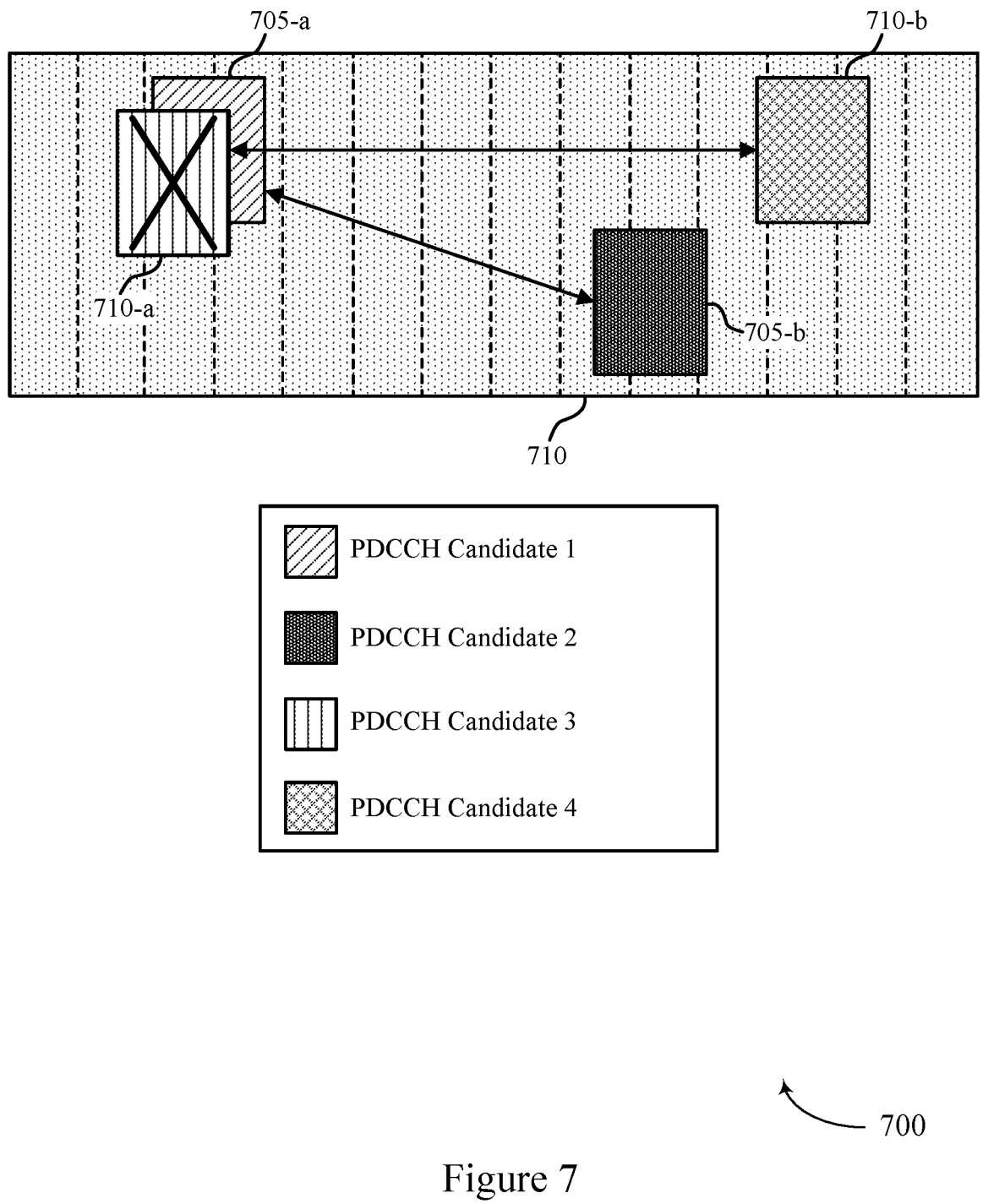
FIG. 7 illustrates an example PDCCH candidate linking procedure that supports managing the selection of reference PDCCH candidates in deployments featuring PDCCH repetition with overlapping SS sets.

FIG. 7 illustrates an example PDCCH candidate linking procedure 700 that supports managing the selection of reference PDCCH candidates in deployments featuring PDCCH repetition with overlapping SS sets. The PDCCH candidate linking procedure 700 may implement or be implemented to realize aspects of the wireless communications system 100 or the signaling diagram 200. For example, a UE 115 and a BS 105, or one or more components of a BS 105, (which may be examples of corresponding devices described herein, including with reference to FIGS. 1 and 2) may employ the PDCCH candidate linking procedure 700 to update a linking between a set of linked PDCCH candidates and to select reference PDCCH candidates for one or both of a first set of linked PDCCH candidates 705 or a second set of linked PDCCH candidates 710 in examples in which two PDCCH candidates from the different sets of linked PDCCH candidates occupy a same set of resources.

For example, the UE 115 may receive an indication (for example, via configuration signaling) from the BS 105 of the first set of linked PDCCH candidates 705 including a PDCCH candidate 705-*a* and a PDCCH candidate 705-*b* and the second set of linked PDCCH candidates 710 including a PDCCH candidate 710-*a* and a PDCCH candidate 710-*b* and, in some examples, the PDCCH candidate 705-*a* and the PDCCH candidate 710-*a* may occupy a same set of resources (such as a same set of CCEs). In such examples in which the PDCCH candidate 705-*a* and the PDCCH candidate 710-*a* may occupy the same set of resources, the UE 115 and the BS 105 may employ one or more mutually understood prioritization rules or reference PDCCH candidate selection rules to maintain a common understanding of which PDCCH candidates are linked for repetition and to support a same selection of reference PDCCH candidates.

In some implementations, for example, the UE 115 and the BS 105 may employ a mutually understood rule or procedure according to which the UE 115 and the BS 105 may not expect two (or more) PDCCH candidates associated with different sets of linked PDCCH candidates to occupy a same set of resources. In other words, for example, the UE 115 may not expect (according to some standard or defined configuration or operating procedure) the PDCCH candidate 705-*a* and the PDCCH candidate 710-*a* to occupy the same set of resources. In such examples, if the UE 115 detects that the PDCCH candidate 705-*a* and the PDCCH candidate 710-*a* use the same set of resources, the UE 115 may assume or interpret that the BS 105 has made a scheduling error and, accordingly, the UE 115 may treat such a scenario in which the PDCCH candidate 705-*a* and the PDCCH candidate 710-*a* use the same set of resources as an error case.

In some aspects, such a rule or procedure that defines the reception of both the PDCCH candidate 705-*a* and the PDCCH candidate 710-*a* over the same set of resources as an error case may be associated with a prohibition for the UE 115 to receive both of the PDCCH candidate 705-*a* or the PDCCH candidate 710-*a* over the same set of resources. Accordingly, in such aspects, the UE 115 may select one of the PDCCH candidate 705-*a* or the PDCCH candidate 710-*a* for monitoring in accordance with the prohibition for the UE 115 to receive both of the PDCCH candidate 705-*a* and the PDCCH candidate 710-*a*. Likewise, the BS 105 may classify one of the PDCCH candidate 705-*a* or the PDCCH candidate 710-*a* as a monitored PDCCH candidate (and may classify the other as a dropped or unmonitored PDCCH candidate) in accordance with the prohibition for the UE 115 to receive both of the PDCCH candidate 705-*a* and the PDCCH candidate 710-*a* (or in accordance with a prohibition for the BS 105 to transmit both of the PDCCH candidate 705-*a* and the PDCCH candidate 710-*a* over the same set of resources).

In some examples, and as illustrated in FIG. 7, the UE 115 and the BS 105 may select the PDCCH candidate 705-*a* for monitoring (and select to drop the PDCCH candidate 710-*a* from monitoring) in accordance with the prohibition for the UE 115 to receive both of the PDCCH candidate 705-*a* and the PDCCH candidate 710-*a*. In such examples in which the UE 115 and the BS 105 select the PDCCH candidate 705-*a* for monitoring by the UE 115 in accordance with the prohibition for the UE 115 to receive both of the PDCCH candidate 705-*a* and the PDCCH candidate 710-*a*, the UE 115 and the BS 105 may further select the first set of PDCCH candidates 705 for monitoring by the UE 115 (and select to drop the second set of PDCCH candidates 710 from monitoring). As such, the UE 115 may monitor the PDCCH candidate 705-*a* and the PDCCH candidate 705-*b* (linked PDCCH candidates 1 and 2) for PDCCH repetition and may refrain from monitoring either of the PDCCH candidate 710-*a* or the PDCCH candidate 710-*b* (linked PDCCH candidates 3 and 4). Likewise, the UE 115 and the BS 105 may select a first reference PDCCH candidate for the first set of linked PDCCH candidates 705 in accordance with a reference PDCCH candidate selection rule and may refrain from selecting a second reference PDCCH candidate for the second set of linked PDCCH candidates 710.

In some other implementations, the UE 115 and the BS 105 may employ a mutually understood prioritization rule and may select one of the PDCCH candidate 705-*a* or the PDCCH candidate 710-*a* for monitoring by the UE 115 in accordance with the prioritization rule. In some examples, the UE 115 and the BS 105 may prioritize a PDCCH candidate with a higher or lower SS set index in accordance with the prioritization rule (such that either a higher or a lower SS set index is associated with a relatively higher priority). In such examples, for instance, the UE 115 and the BS 105 may select the PDCCH candidate 705-*a* instead of the PDCCH candidate 710-*a* as a result of the PDCCH candidate 710-*a* having a first SS set index that is associated with a lower priority than a second SS set index of the PDCCH candidate 705-*a*.

In some other examples, the UE 115 and the BS 105 may prioritize one of the PDCCH candidate 705-*a* or the PDCCH candidate 710-*a* as a result of a comparison of SS set indexes of PDCCH candidates that are linked with the PDCCH candidate 705-*a* and the PDCCH candidate 710-*a*. In such examples, for instance, the UE 115 and the BS 105 may compare a first SS index of the PDCCH candidate 710-*b* (the PDCCH candidate linked to the PDCCH candidate 710-*a*) to a second SS set index of the PDCCH candidate 705-*b* (the PDCCH candidate linked to the PDCCH candidate 705-*a*). Accordingly, the UE 115 and the BS 105 may select one of the PDCCH candidate 705-*a* or the PDCCH candidate 710-*a* in accordance with which of their respective linked PDCCH candidates is associated with a relatively higher priority SS set index. For example, the UE 115 and the BS 105 may select the PDCCH candidate 705-*a* for monitoring by the UE 115 (and to drop the PDCCH candidate 710-*a*) as a result of the PDCCH candidate 710-*b* having a first SS set index that is associated with a relatively lower priority than a second SS set index of the PDCCH candidate 705-*b*.

In some other examples, the UE 115 and the BS 105 may prioritize one of the PDCCH candidate 705-*a* or the PDCCH candidate 710-*a* as a result of a candidate index associated with each of the PDCCH candidate 705-*a* and the PDCCH candidate 710-*a*. In such examples, for instance, the UE 115 or the BS 105 may select to monitor one of the PDCCH candidate 705-*a* or the PDCCH candidate 710-*a* depending on which of the PDCCH candidate 705-*a* or the PDCCH candidate 710-*a* has a candidate index (such as a PDCCH candidate index) that is associated with a relatively higher priority. In some aspects, a lower candidate index may be associated with a relatively lower priority. Accordingly, in such aspects, the UE 115 and the BS 105 may select the PDCCH candidate 705-*a* for monitoring by the UE 115 (and to drop the PDCCH candidate 710-*a*) as a result of the PDCCH candidate 710-*a* having a first PDCCH candidate index that is relatively lower than a second PDCCH candidate index of the PDCCH candidate 705-*a*.

In such examples in which the prioritization rule defines a prioritized PDCCH candidate based on relative PDCCH candidate indexes and if the PDCCH candidate 705-*a* and the PDCCH candidate 710-*a* have a same PDCCH candidate index, the UE 115 and the BS 105 may select one of the PDCCH candidate 705-*a* or the PDCCH candidate 710-*a* as a result of which PDCCH candidate has an SS set index that is associated with a relatively higher priority. For example, if the PDCCH candidate 705-*a* and the PDCCH candidate 710-*a* have a same PDCCH candidate index, the UE 115 and the BS 105 may select the PDCCH candidate 705-*a* for monitoring by the UE 115 as a result of the PDCCH candidate 705-*a* having an SS set index that is associated with a relatively higher priority than an SS set index of the PDCCH candidate 710-*a*.

Further, although described in the context of prioritizing the PDCCH candidate 705-*a* over the PDCCH candidate 710-*a* on a PDCCH candidate level or granularity, the UE 115 and the BS 105 also may apply the prioritization rule on a monitoring occasion level, or an SS set level. For instance, in examples in which the UE 115 and the BS 105 prioritize the PDCCH candidate 705-*a* for monitoring instead of the PDCCH candidate 710-*a*, the UE 115 and the BS 105 also may prioritize a first monitoring occasion that is associated with the PDCCH candidate 705-*a* over a second monitoring occasion that is associated with the PDCCH candidate 710-*a*. In other words, for example, the UE 115 may refrain from monitoring over a monitoring occasion that is associated with the PDCCH candidate 710-*a* as a result of selecting to monitor for the PDCCH candidate 705-*a* instead of the PDCCH candidate 710-*a*. Additionally, or alternatively, in examples in which the UE 115 and the BS 105 prioritize the PDCCH candidate 705-*a* for monitoring instead of the PDCCH candidate 710-*a*, the UE 115 and the BS 105 may prioritize a first SS set that is associated with the PDCCH candidate 705-*a* over a second SS set that is associated with the PDCCH candidate 710-*a*. In other words, for example, the UE 115 may refrain from monitoring over an SS set that is associated with the PDCCH candidate 710-*a* as a result of selecting to monitor for the PDCCH candidate 705-*a* instead of the PDCCH candidate 710-*a*.

Accordingly, the UE 115 may select to monitor the PDCCH candidate 705-*a* and the BS 105 may likewise select or classify the PDCCH candidate 705-*a* as a monitored PDCCH candidate as a result of the UE 115 and the BS 105 employing the mutually understood prioritization rule. As such, the UE 115 may detect (and decode) DCI conveyed by the PDCCH candidate 705-*a* over the resources occupied by both the PDCCH candidate 705-*a* and the PDCCH candidate 710-*a* and may interpret the detected DCI based on a reference PDCCH candidate among the first set of linked PDCCH candidates 705. In other words, the UE 115 may define any scheduling information or restrictions associated with or obtained from the DCI conveyed by the PDCCH candidate 705-*a* relative to the reference PDCCH candidate for the first set of linked PDCCH candidates 705. In some aspects, the UE 115 and the BS 105 may select the reference PDCCH candidate for the first set of linked PDCCH candidates 705 in accordance with a mutually understood reference PDCCH candidate selection rule and assuming that the PDCCH candidate 705-*a* and the PDCCH candidate 705-*b* are still linked for repetition.

As a result of selecting the PDCCH candidate 705-*a* for monitoring by the UE 115 instead of the PDCCH candidate 710-*a*, the UE 115 and the BS 105 may further consider the PDCCH candidate 710-*b* (or any PDCCH candidate linked for repetition with the dropped PDCCH candidate 710-*a*) as a monitored PDCCH candidate or as an unmonitored PDCCH candidate in accordance with a mutually understood procedure. In some examples, for instance, the UE 115 may refrain from monitoring for the PDCCH candidate 710-*b* as a result of dropping the PDCCH candidate 710-*a* in accordance with the procedure. Alternatively, in some other examples, the UE 115 and the BS 105 may select the PDCCH candidate 710-*b* for monitoring by the UE 115 in accordance with the procedure. In such examples, the UE 115 and the BS 105 may update the linking of the second set of linked PDCCH candidates 710 (as a result of monitoring for the PDCCH candidate 710-*b* and dropping the PDCCH candidate 710-*a*) or may maintain the linking of the second set of linked PDCCH candidates 710 (despite monitoring for the PDCCH candidate 710-*b* and dropping the PDCCH candidate 710-*a*).

For instance, in examples in which the UE 115 and the BS 105 update the linking of the second set of linked PDCCH candidates 710, the UE 115 and the BS 105 may unlink the PDCCH candidate 710-*b* from the PDCCH candidate 710-*a* and may assume that the PDCCH candidate 710-*b* is an individual or standalone PDCCH candidate (such as a PDCCH candidate that is not linked for repetition with other PDCCH candidates). Accordingly, the UE 115 and the BS 105 may refrain from selecting a reference PDCCH candidate for the second set of PDCCH candidates 710 (or, equivalently, may select the PDCCH candidate 710-*b* as the reference PDCCH candidate for the second set of PDCCH candidates 710).

Alternatively, in examples in which the UE 115 and the BS 105 maintain the linking of the second set of PDCCH candidates 710, the UE 115 and the BS 105 may select a reference PDCCH candidate from among the second set of PDCCH candidates 710. In other words, the UE 115 and the BS 105 may select the PDCCH candidate 710-*a* or the PDCCH candidate 710-*b* as the second reference PDCCH candidate for the second set of linked PDCCH candidates 710 (even if the PDCCH candidate 710-*a* is a dropped or unmonitored PDCCH candidate). In such examples, the UE 115 and the BS 105 may define the scheduling information or restrictions associated with the DCI conveyed over the PDCCH candidate 710-*b* relative to either the PDCCH candidate 710-*a* or the PDCCH candidate 710-*b*.

Additionally, or alternatively, the UE 115 and the BS 105 may employ a reference PDCCH candidate selection rule regardless of or transparent to the prioritization rule (which may define for which of the PDCCH candidate 705-*a* or the PDCCH candidate 710-*a* the UE 115 monitors and whether the UE 115 monitors PDCCH candidates linked to the dropped PDCCH candidate). For example, the UE 115 may detect a DCI over a PDCCH candidate, and the UE 115 and the BS 105 may select a reference PDCCH candidate for the detected DCI regardless of for which PDCCH candidates the UE 115 actually monitors.

In examples in which the PDCCH candidate 710-*a* is dropped (not monitored), for instance, the UE 115 and the BS 105 may consider, for decoding, that the PDCCH candidate 705-*a* and the PDCCH candidate 705-*b* are linked for repetition and, accordingly, may select a reference PDCCH candidate as the PDCCH candidate 705-*a* or the PDCCH candidate 705-*b*. Alternatively, in such examples in which the PDCCH candidate 710-*a* is dropped (not monitored), the UE 115 and the BS 105 may consider, for decoding, that the PDCCH candidate 705-*a*, the PDCCH candidate 705-*b*, and the PDCCH candidate 710-*b* are linked for repetition and, accordingly, may select a reference PDCCH candidate as the PDCCH candidate 705-*a*, the PDCCH candidate 705-*b*, or the PDCCH candidate 710-*b*. In some aspects, the UE 115 may consider the PDCCH candidate 705-*a*, the PDCCH candidate 705-*b*, and the PDCCH candidate 710-*b* as linked for repetition in examples in which the UE 115 refrains from monitoring for the PDCCH candidate 710-*a* but still monitors for the PDCCH candidate 710-*b*. Further, although described in the context of dropping the PDCCH candidate 710-*a*, the UE 115 and the BS 105 may similarly consider the PDCCH candidate 710-*a* and the PDCCH candidate 710-*b* as linked for repetition or consider the PDCCH candidate 710-*a*, the PDCCH candidate 710-*b*, and the PDCCH candidate 705-*b* as linked for repetition in accordance with the reference PDCCH candidate selection rule in examples in which the UE 115 and the BS 105 select the PDCCH candidate 710-*a* for monitoring by the UE 115 instead of the PDCCH candidate 705-*a*.

As such, the UE 115 and the BS 105 may achieve a common understanding of a reference PDCCH candidate from which to define scheduling information or restrictions for one or more multiple sets of linked PDCCH candidates, which may increase compatibility and consistency between the UE 115 and the BS 105 and, in turn, increase the likelihood for successful communication between the UE 115 and the BS 105. For example, as a result of employing such mutually understood rules or procedures, the UE 115 and the BS 105 may commonly prioritize one of the PDCCH candidate 705-*a* or the PDCCH candidate 710-*a* for monitoring by the UE 115 as well as commonly select a first reference PDCCH candidate for the first set of linked PDCCH candidates 705 or a second reference PDCCH candidate for the second set of linked PDCCH candidates 710, or both.

Figure 8:
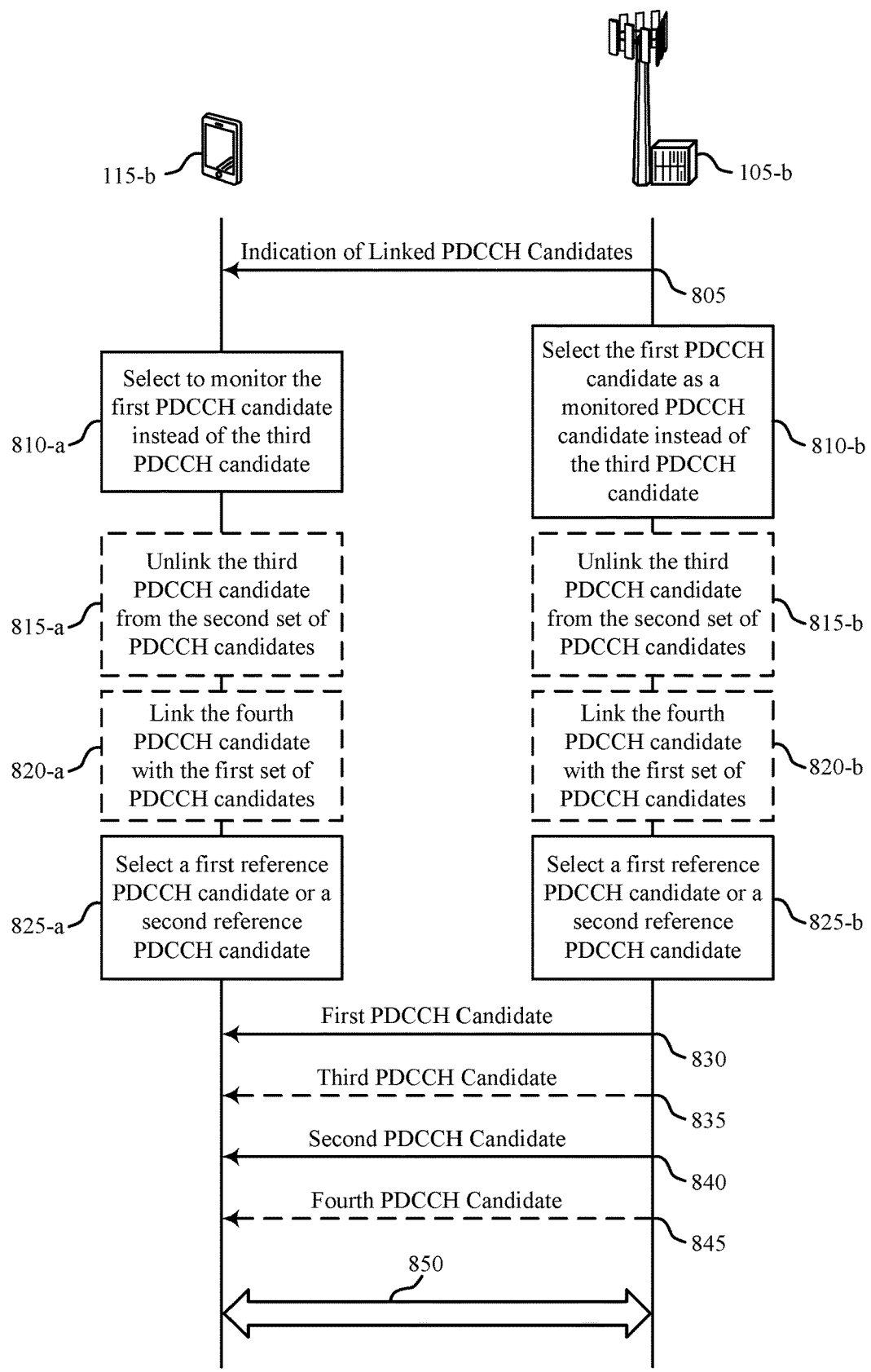
FIG. 8 illustrates an example process flow that supports managing the selection of reference PDCCH candidates in deployments featuring PDCCH repetition with overlapping SS sets.

FIG. 8 illustrates an example process flow 800 that supports managing the selection of reference PDCCH candidates in deployments featuring PDCCH repetition with overlapping SS sets. The process flow 800 may implement or be implemented to realize aspects of the wireless communications system 100 or the signaling diagram 200. For example, the process flow 800 may illustrate communication between a UE 115-*b* and a BS 105-*b*, or one or more components of the BS 105-*b*, which may be examples of corresponding devices described herein, including with reference to FIGS. 1 and 2. In some examples, the UE 115-*b* and the BS 105-*b* may employ one or more mutually understood rules or procedures, such as a prioritization rule and reference PDCCH candidate selection rule, for maintaining a common understanding of multiple sets of linked PDCCH candidates and for selecting one or more reference PDCCH candidates for the multiple sets of linked PDCCH candidates in examples in which PDCCH candidates of the multiple sets of PDCCH candidates occupy a same set of resources.

In the following description of the process flow 800, the operations may be performed (for example, reported or provided) in a different order than the order shown, or the operations performed by the UE 115-*b* and the BS 105-*b* may be performed in different orders or at different times. For example, specific operations also may be left out of the process flow 800, or other operations may be added to the process flow 800. Further, although some operations or signaling may be shown to occur at different times for discussion purposes, these operations may actually occur at the same time.

At 805, the UE 115-*b* may receive, from the BS 105-*b*, an indication of a first set of linked PDCCH candidates including a first PDCCH candidate and a second PDCCH candidate that are associated with (for example, convey or carry) first repeated PDCCH information (such as a first DCI) and an indication of a second set of linked PDCCH candidates including a third PDCCH candidate and a fourth PDCCH candidate that are associated with (for example, convey or carry) second repeated PDCCH information (such as a second DCI). For example, the first set of linked PDCCH candidates may be linked for repetition of the first PDCCH information such that each PDCCH candidate of the first set of linked PDCCH candidates carries the same first PDCCH information. Similarly, the second set of linked PDCCH candidates may be linked for repetition of the second PDCCH information such that each PDCCH candidate of the second set of linked PDCCH candidates carries the same second PDCCH information. In some examples, the first PDCCH candidate and the third PDCCH candidate occupy a same set of resources (such as a same set of CCEs), such that the UE 115-*b* may be unable to receive both of the first PDCCH candidate and the third PDCCH candidate.

At 810-*a*, the UE 115-*b* may select to monitor the first PDCCH candidate instead of the third PDCCH candidate as a result of the resource overlap between the first PDCCH candidate and the third PDCCH candidate. Similarly, at 810-*b*, the BS 105-*b* may select the first PDCCH candidate as a monitored PDCCH candidate instead of the third PDCCH candidate as a result of the resource overlap between the first PDCCH candidate and the third PDCCH candidate. In some implementations, the UE 115-*b* and the BS 105-*b* may select the first PDCCH candidate for monitoring by the UE 115-*b* instead of the third PDCCH candidate in accordance with a prioritization rule that is common or mutually understood to both the UE 115-*b* and the BS 105-*b*. Additional details relating to such a mutually understood prioritization rule are described herein, including with reference to FIG. 7.

At 815-*a*, the UE 115-*b* may, in some implementations, unlink the third PDCCH candidate from the second set of PDCCH candidates in accordance with selecting to monitor for the first PDCCH candidate instead of the third PDCCH candidate. Similarly, at 815-*b*, the BS 105-*b* may, in some implementations, unlink the third PDCCH candidate from the second set of PDCCH candidates in accordance with selecting the first PDCCH candidate as a monitored PDCCH candidate instead of the third PDCCH candidate. In such implementations, the UE 115-*b* and the BS 105-*b* may refrain from selecting a second reference PDCCH candidate for the second set of linked PDCCH candidates and or, equivalently, may select the fourth PDCCH candidate as the reference PDCCH candidate for the second set of linked PDCCH candidates (in examples in which the UE 115-*b* selects to monitor for the fourth PDCCH candidate, which the UE 115-*b* and the BS 105-*b* may interpret as an individual PDCCH candidate).

At 820-*a*, the UE 115-*b* may, in some implementations, link the fourth PDCCH candidate with the first set of linked PDCCH candidates in accordance with selecting to monitor for the first PDCCH candidate instead of the third PDCCH candidate and a reference selection rule (which may be equivalently referred to as a reference PDCCH candidate selection rule). Similarly, at 820-*b*, the BS 105-*b* may, in some implementations, link the fourth PDCCH candidate with the first set of linked PDCCH candidates in accordance with selecting the first PDCCH candidate as a monitored PDCCH candidate instead of the third PDCCH candidate and the reference selection rule. In some examples, the UE 115-*b* and the BS 105-*b* may link the fourth PDCCH candidate with the first set of PDCCH candidates in examples in which the UE 115-*b* and the BS 105-*b* employ a reference PDCCH candidate selection rule that is transparent to the prioritization rule (according to which the UE 115-*a* and the BS 105-*b* select PDCCH candidates for monitoring by the UE 115-*b*). Additional details relating to such an updating of the linking between the various PDCCH candidates as a result of selecting to monitor for the first PDCCH candidate instead of the third PDCCH candidate and the reference selection rule are described herein, including with reference to FIG. 7.

At 825-*a*, the UE 115-*b* may select a first reference (such as a first reference PDCCH candidate) for the first set of linked PDCCH candidates or a second reference (such as a second reference PDCCH candidate) for the second set of linked PDCCH candidates, or both. Similarly, at 825-*b*, the BS 105-*b* may select the first reference (such as the first reference PDCCH candidate) for the first set of linked PDCCH candidates or the second reference (such as the second reference PDCCH candidate) for the second set of linked PDCCH candidates, or both. In some examples, the UE 115-*b* and the BS 105-*b* may select the first reference or the second reference, or both, in connection with selecting the first PDCCH candidate for monitoring by the UE 115-*b* instead of the third PDCCH candidate. In other words, the selecting of the first reference or the second reference, or both, may be triggered by the selecting of the first PDCCH candidate for monitoring by the UE 115-*b* instead of the third PDCCH candidate. In some implementations, the UE 115-*b* and the BS 105-*b* may select the first reference or the second reference, or both, in accordance with the reference selection rule, as described in more detail herein, including with reference to FIG. 7.

At 830, the BS 105-*b* may output (such as transmit) the first PDCCH information over the first PDCCH candidate and, as a result of selecting to monitor for the first PDCCH candidate instead of the third PDCCH candidate, the UE 115-*b* may receive the first PDCCH information over the first PDCCH candidate. At 835, the BS 105-*b* may, in some implementations, output (such as transmit) the second PDCCH information over the third PDCCH candidate and, as a result of selecting to monitor for the first PDCCH candidate instead of the third PDCCH candidate, the UE 115-*b* may refrain from receiving the second PDCCH information over the third PDCCH candidate. In some other implementations, the BS 105-*b* may refrain from transmitting the second PDCCH information over the third PDCCH candidate as a result of classifying the first PDCCH candidate as a monitored PDCCH candidate instead of the third PDCCH candidate.

At 840, the BS 105-*b* may output (such as transmit) another instance of the first PDCCH information over the second PDCCH candidate and, as a result of selecting to monitor for the first PDCCH candidate instead of the third PDCCH candidate, the UE 115-*b* may receive the first PDCCH information over the second PDCCH candidate. At 845, the BS 105-*b* may output (such as transmit) another instance of the second PDCCH information over the fourth PDCCH candidate and UE 115-*b* may select to monitor for the fourth PDCCH candidate depending on a rule or procedure. In some implementations, for example, the UE 115-*b* may select to monitor for the fourth PDCCH candidate despite selecting to monitor for the first PDCCH candidate instead of the third PDCCH candidate. In some other implementations, the UE 115-*b* may refrain from monitoring for the fourth PDCCH candidate as a result of selecting to monitor for the first PDCCH candidate instead of the third PDCCH candidate.

At 850, the UE 115-*b* may communicate with the BS 105-*b* in accordance with the first reference or the second reference. For example, the UE 115-*b* and the BS 105-*b* may define scheduling information associated with (obtained from) the first PDCCH information or the second PDCCH information relative to one of the first reference or the second reference. In some examples, for instance, the UE 115-*b* and the BS 105-*b* may define the scheduling information as a function of a time domain property or a frequency domain property of the first reference or the second reference, or both.

Figure 9:
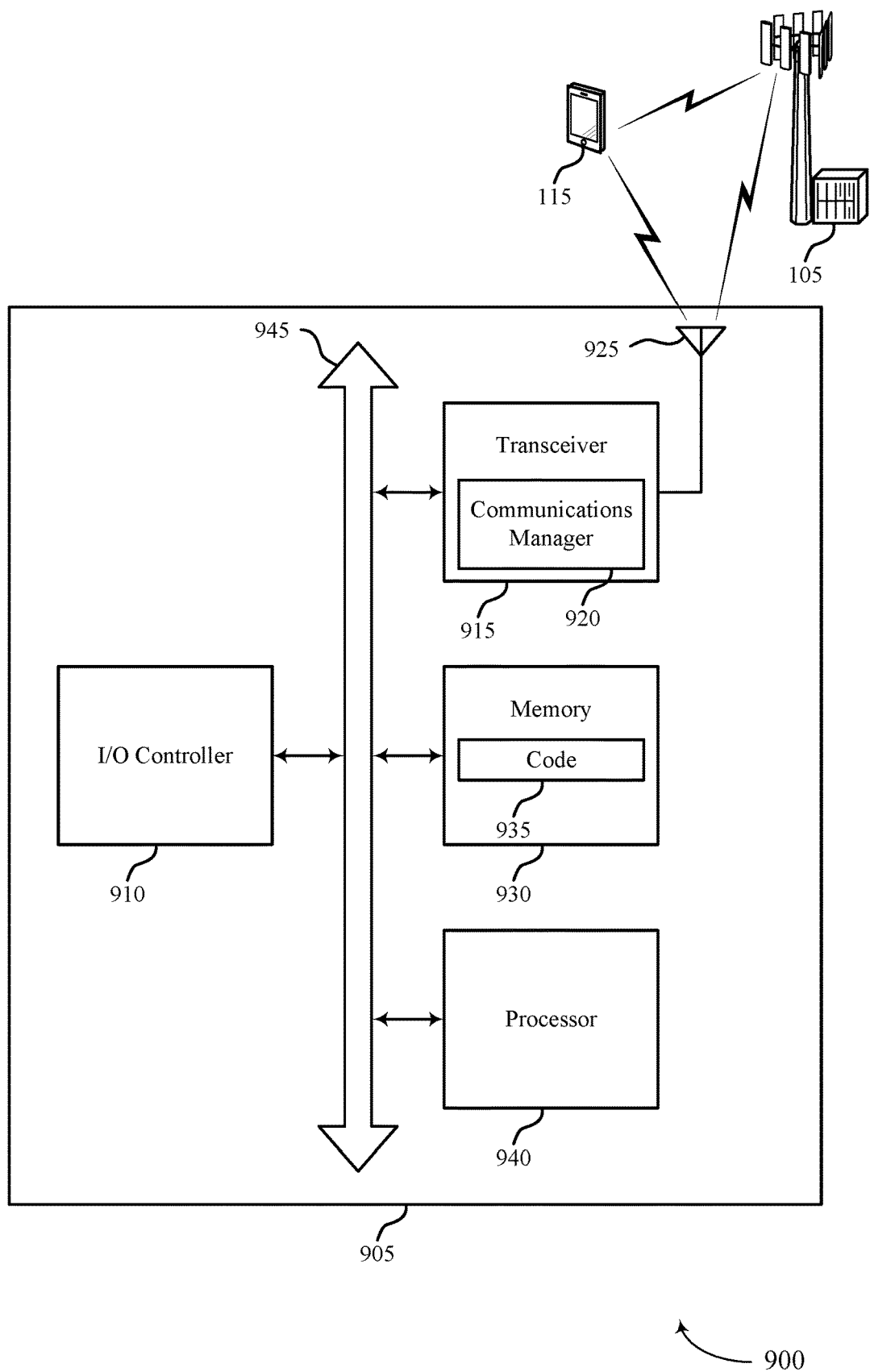
FIGS. 9 and 10 show block diagrams of example devices that supports managing the selection of reference PDCCH candidates in deployments featuring PDCCH repetition with overlapping SS sets.

FIG. 9 shows a block diagram 900 of an example device 905 that supports managing the selection of reference PDCCH candidates in deployments featuring PDCCH repetition with overlapping SS sets. The device 905 may communicate wirelessly with one or more BSs 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, or electrically) via one or more buses (such as a bus 945).

The I/O controller 910 may manage input and output signals for the device 905. The I/O controller 910 also may manage peripherals not integrated into the device 905. In some implementations, the I/O controller 910 may represent a physical connection or port to an external peripheral. In some implementations, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some implementations, the I/O controller 910 may be implemented as part of a processor, such as the processor 940. In some implementations, a user may interact with the device 905 via the I/O controller 910 or via hardware components controlled by the I/O controller 910.

In some implementations, the device 905 may include a single antenna 925. However, in some other implementations, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some implementations, the code 935 may not be directly executable by the processor 940 but may cause a computer (for example, if compiled and executed) to perform functions described herein. In some implementations, the memory 930 may contain, among other things, a basic I/O system (BIOS) which may control basic hardware or software operation such as the interaction with peripheral components or devices.

The processor 940 may be any one or more suitable processors capable of executing scripts or instructions of one or more software programs stored in the device 905 (such as within the memory 930). In some implementations, the processor 940 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905.

The processing system of the device 905 may interface with other components of the device 905 and may process information received from other components (such as inputs or signals) or output information to other components. For example, a chip or modem of the device 905 may include a processing system, a first interface to output information, and a second interface to obtain information. In some implementations, the first interface may refer to an interface between the processing system of the chip or modem and a transmitter, such that the device 905 may transmit information output from the chip or modem. In some implementations, the second interface may refer to an interface between the processing system of the chip or modem and a receiver, such that the device 905 may obtain information or signal inputs, and the information may be passed to the processing system. A person having ordinary skill in the art will readily recognize that the first interface also may obtain information or signal inputs, and the second interface also may output information or signal outputs.

The communications manager 920 may support wireless communication at a UE in accordance with examples as disclosed herein. For example, the communications manager 920 may be configured as or otherwise support a means for receiving an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources. The communications manager 920 may be configured as or otherwise support a means for selecting to monitor the first PDCCH candidate instead of the third PDCCH candidate as a result of a resource overlap between the first PDCCH candidate and the third PDCCH candidate. The communications manager 920 may be configured as or otherwise support a means for selecting a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

In some examples, selecting to monitor the first PDCCH candidate instead of the third PDCCH candidate as a result of the resource overlap between the first PDCCH candidate and the second PDCCH candidate is in accordance with a prohibition for the UE to receive both of the first PDCCH candidate and the third PDCCH candidate occupying the same set of resources.

In some examples, to support selecting to monitor the first PDCCH candidate instead of the third PDCCH candidate, the communications manager 920 may be configured as or otherwise support a means for selecting to monitor the first PDCCH candidate instead of the third PDCCH candidate as a result of the third PDCCH candidate having a first SS set index that is associated with a lower priority than a second SS set index of the first PDCCH candidate.

In some examples, to support selecting to monitor the first PDCCH candidate instead of the third PDCCH candidate, the communications manager 920 may be configured as or otherwise support a means for selecting to monitor the first PDCCH candidate instead of the third PDCCH candidate as a result of the fourth PDCCH candidate having a first search space (SS) set index that is associated with a lower priority than a second SS set index of the second PDCCH candidate.

In some examples, to support selecting to monitor the first PDCCH candidate instead of the third PDCCH candidate, the communications manager 920 may be configured as or otherwise support a means for selecting to monitor the first PDCCH candidate instead of the third PDCCH candidate as a result of the third PDCCH candidate having a first PDCCH candidate index that is lower than a second PDCCH candidate index of the first PDCCH candidate.

In some examples, the communications manager 920 may be configured as or otherwise support a means for refraining from monitoring over a monitoring occasion associated with the third PDCCH candidate as a result of selecting to monitor for the first PDCCH candidate instead of the third PDCCH candidate.

In some examples, the communications manager 920 may be configured as or otherwise support a means for refraining from monitoring over a search space (SS) set associated with the third PDCCH candidate as a result of selecting to monitor for the first PDCCH candidate instead of the third PDCCH candidate.

In some examples, the communications manager 920 may be configured as or otherwise support a means for monitoring the fourth PDCCH candidate, where selecting the second reference for the second set of linked PDCCH candidates is in accordance with monitoring the fourth PDCCH candidate.

In some examples, the communications manager 920 may be configured as or otherwise support a means for unlinking, from the second set of linked PDCCH candidates, the third PDCCH candidate in accordance with selecting to monitor the first PDCCH candidate instead of the third PDCCH candidate, where selecting the second reference for the second set of linked PDCCH candidates includes selecting the fourth PDCCH candidate as the second reference.

In some examples, to support selecting the second reference for the second set of linked PDCCH candidates, the communications manager 920 may be configured as or otherwise support a means for selecting the third PDCCH candidate or the fourth PDCCH candidate as the second reference for the second set of linked PDCCH candidates in accordance with a reference selection rule.

In some examples, the reference selection rule defines a procedure for selecting the second reference from a set of PDCCH candidates including monitored PDCCH candidates and unmonitored PDCCH candidates of the second set of linked PDCCH candidates.

In some examples, the communications manager 920 may be configured as or otherwise support a means for refraining from monitoring the fourth PDCCH candidate in accordance with selecting to monitor the first PDCCH candidate instead of the third PDCCH candidate, where selecting the first reference for the first set of linked PDCCH candidates or the second reference for the second set of linked PDCCH candidates includes selecting only the first reference for the first set of linked PDCCH candidates.

In some examples, to support selecting the first reference for the first set of linked PDCCH candidates or the second reference for the second set of linked PDCCH candidates, or both, the communications manager 920 may be configured as or otherwise support a means for selecting the first PDCCH candidate or the second PDCCH candidate as the first reference for the first set of linked PDCCH candidates in accordance with a reference selection rule.

In some examples, to support selecting the first reference for the first set of linked PDCCH candidates or the second reference for the second set of linked PDCCH candidates, or both, the communications manager 920 may be configured as or otherwise support a means for selecting the first PDCCH candidate, the second PDCCH candidate, or the fourth PDCCH candidate as the first reference for the first set of linked PDCCH candidates in accordance with a reference selection rule.

In some examples, the communications manager 920 may be configured as or otherwise support a means for linking the fourth PDCCH candidate with the first set of linked PDCCH candidates in accordance with selecting to monitor the first PDCCH candidate instead of the third PDCCH candidate and the reference selection rule.

In some examples, the communications manager 920 may be configured as or otherwise support a means for communicating with a component of a BS in accordance with the first reference or the second reference, or both, where scheduling information associated with the communicating with the BS is a function of a time domain property or a frequency domain property of the first reference or the second reference, or both.

In some examples, the communications manager 920 may be configured to perform various operations (such as receiving, monitoring, or transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of managing the selection of reference PDCCH candidates in deployments featuring PDCCH repetition with overlapping SS sets as described herein, or the processor 940 and the memory 930 may be otherwise configured to perform or support such operations.

Figure 10:
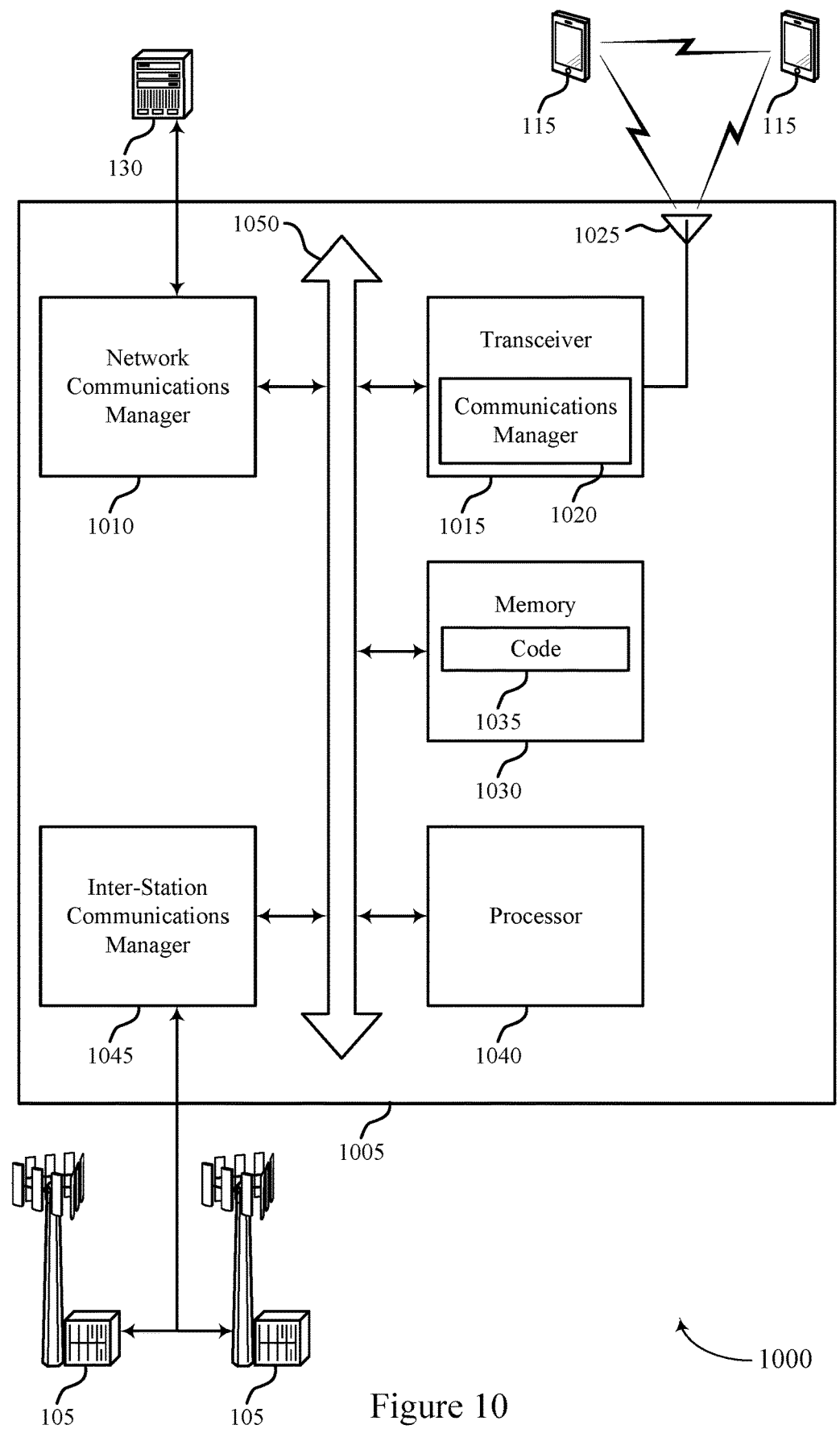

FIG. 10 shows a block diagram 1000 of an example device 1005 that supports managing the selection of reference PDCCH candidates in deployments featuring PDCCH repetition with overlapping SS sets. The device 1005 may communicate wirelessly with one or more BSs 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (for example, operatively, communicatively, functionally, electronically, or electrically) via one or more buses (such as a bus 1050).

The network communications manager 1010 may manage communications with a core network 130 (such as via one or more wired backhaul links). For example, the network communications manager 1010 may manage the transfer of data communications for client devices, such as one or more UEs 115.

In some implementations, the device 1005 may include a single antenna 1025. However, in some other implementations, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 also may include a modem to modulate the packets, to provide the modulated packets to one or more antennas 1025 for transmission, and to demodulate packets received from the one or more antennas 1025.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some implementations, the code 1035 may not be directly executable by the processor 1040 but may cause a computer (for example, if compiled and executed) to perform functions described herein. In some implementations, the memory 1030 may contain, among other things, a BIOS which may control basic hardware or software operation such as the interaction with peripheral components or devices.

The inter-station communications manager 1045 may manage communications with other BSs 105, and may include a controller or scheduler for controlling communications with UEs 115 in cooperation with other BSs 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between BSs 105.

The processor 1040 may be any one or more suitable processors capable of executing scripts or instructions of one or more software programs stored in the device 1005 (such as within the memory 1030). In some implementations, the processor 1040 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005.

The processing system of the device 1005 may interface with other components of the device 1005 and may process information received from other components (such as inputs or signals) or output information to other components. For example, a chip or modem of the device 1005 may include a processing system, a first interface to output information, and a second interface to obtain information. In some implementations, the first interface may refer to an interface between the processing system of the chip or modem and a transmitter, such that the device 1005 may transmit information output from the chip or modem. In some implementations, the second interface may refer to an interface between the processing system of the chip or modem and a receiver, such that the device 1005 may obtain information or signal inputs, and the information may be passed to the processing system. A person having ordinary skill in the art will readily recognize that the first interface also may obtain information or signal inputs, and the second interface also may output information or signal outputs.

The communications manager 1020 may support wireless communication at an apparatus of a BS in accordance with examples as disclosed herein. For example, the communications manager 1020 may be configured as or otherwise support a means for outputting an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources. The communications manager 1020 may be configured as or otherwise support a means for selecting the first PDCCH candidate as a monitored PDCCH candidate instead of the third PDCCH candidate as a result of a resource overlap between the first PDCCH candidate and the third PDCCH candidate.

The communications manager 1020 may be configured as or otherwise support a means for selecting a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate. The communications manager 1020 may be configured as or otherwise support a means for outputting, over the first set of linked PDCCH candidates, the first PDCCH information and, over at least a subset of the second set of linked PDCCH candidates, the second PDCCH information in accordance with the selected first reference or the selected second reference, or both.

In some examples, selecting the first PDCCH candidate as the monitored PDCCH candidate instead of the third PDCCH candidate as a result of the resource overlap between the first PDCCH candidate and the third PDCCH candidate includes a prohibition for the BS to output both of the first PDCCH candidate and the third PDCCH candidate occupying the same set of resources.

In some examples, to support selecting the first PDCCH candidate as the monitored PDCCH candidate instead of the third PDCCH candidate, the communications manager 1020 may be configured as or otherwise support a means for selecting the first PDCCH candidate as the monitored PDCCH candidate instead of the third PDCCH candidate as a result of the third PDCCH candidate having a first search space (SS) set index that is associated with a lower priority than a second SS set index of the first PDCCH candidate.

In some examples, to support selecting the first PDCCH candidate as the monitored PDCCH candidate instead of the third PDCCH candidate, the communications manager 1020 may be configured as or otherwise support a means for selecting the first PDCCH candidate as the monitored PDCCH candidate instead of the third PDCCH candidate as a result of the fourth PDCCH candidate having a first SS set index that is associated with a lower priority than a second SS set index of the second PDCCH candidate.

In some examples, to support selecting the first PDCCH candidate as the monitored PDCCH candidate instead of the third PDCCH candidate, the communications manager 1020 may be configured as or otherwise support a means for selecting the first PDCCH candidate as the monitored PDCCH candidate instead of the third PDCCH candidate as a result of the third PDCCH candidate having a first PDCCH candidate index that is lower than a second PDCCH candidate index of the first PDCCH candidate.

In some examples, the communications manager 1020 may be configured as or otherwise support a means for selecting the fourth PDCCH candidate as another monitored PDCCH candidate, where selecting the second reference for the second set of linked PDCCH candidates is in accordance with selecting the fourth PDCCH candidate as the other monitored PDCCH candidate.

In some examples, the communications manager 1020 may be configured as or otherwise support a means for unlinking, from the second set of linked PDCCH candidates, the third PDCCH candidate in accordance with selecting the first PDCCH candidate as the monitored PDCCH candidate instead of the third PDCCH candidate, where selecting the second reference for the second set of linked PDCCH candidates includes selecting the fourth PDCCH candidate as the second reference.

In some examples, to support selecting the second reference for the second set of linked PDCCH candidates, the communications manager 1020 may be configured as or otherwise support a means for selecting the third PDCCH candidate or the fourth PDCCH candidate as the second reference for the second set of linked PDCCH candidates in accordance with a reference selection rule.

In some examples, the reference selection rule defines a procedure for selecting the second reference from a set of PDCCH candidates including monitored PDCCH candidates and unmonitored PDCCH candidates of the second set of linked PDCCH candidates.

In some examples, the communications manager 1020 may be configured as or otherwise support a means for selecting the fourth PDCCH candidate as an unmonitored PDCCH candidate in accordance with selecting the first PDCCH candidate as the monitored PDCCH candidate instead of the third PDCCH candidate, where selecting the first reference for the first set of linked PDCCH candidates or the second reference for the second set of linked PDCCH candidates includes selecting only the first reference for the first set of linked PDCCH candidates.

In some examples, to support selecting the first reference for the first set of linked PDCCH candidates or the second reference for the second set of linked PDCCH candidates, or both, the communications manager 1020 may be configured as or otherwise support a means for selecting the first PDCCH candidate or the second PDCCH candidate as the first reference for the first set of linked PDCCH candidates in accordance with a reference selection rule.

In some examples, to support selecting the first reference for the first set of linked PDCCH candidates or the second reference for the second set of linked PDCCH candidates, or both, the communications manager 1020 may be configured as or otherwise support a means for selecting the first PDCCH candidate, the second PDCCH candidate, or the fourth PDCCH candidate as the first reference for the first set of linked PDCCH candidates in accordance with a reference selection rule.

In some examples, the communications manager 1020 may be configured as or otherwise support a means for linking the fourth PDCCH candidate with the first set of linked PDCCH candidates in accordance with selecting the first PDCCH candidate as the monitored PDCCH candidate instead of the third PDCCH candidate and the reference selection rule.

In some examples, the communications manager 1020 may be configured as or otherwise support a means for communicating in accordance with the first reference or the second reference, or both, where scheduling information associated with the communicating is a function of a time domain property or a frequency domain property of the first reference or the second reference, or both.

In some examples, the communications manager 1020 may be configured to perform various operations (such as receiving, monitoring, or transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of managing the selection of reference PDCCH candidates in deployments featuring PDCCH repetition with overlapping SS sets as described herein, or the processor 1040 and the memory 1030 may be otherwise configured to perform or support such operations.

Figure 11:
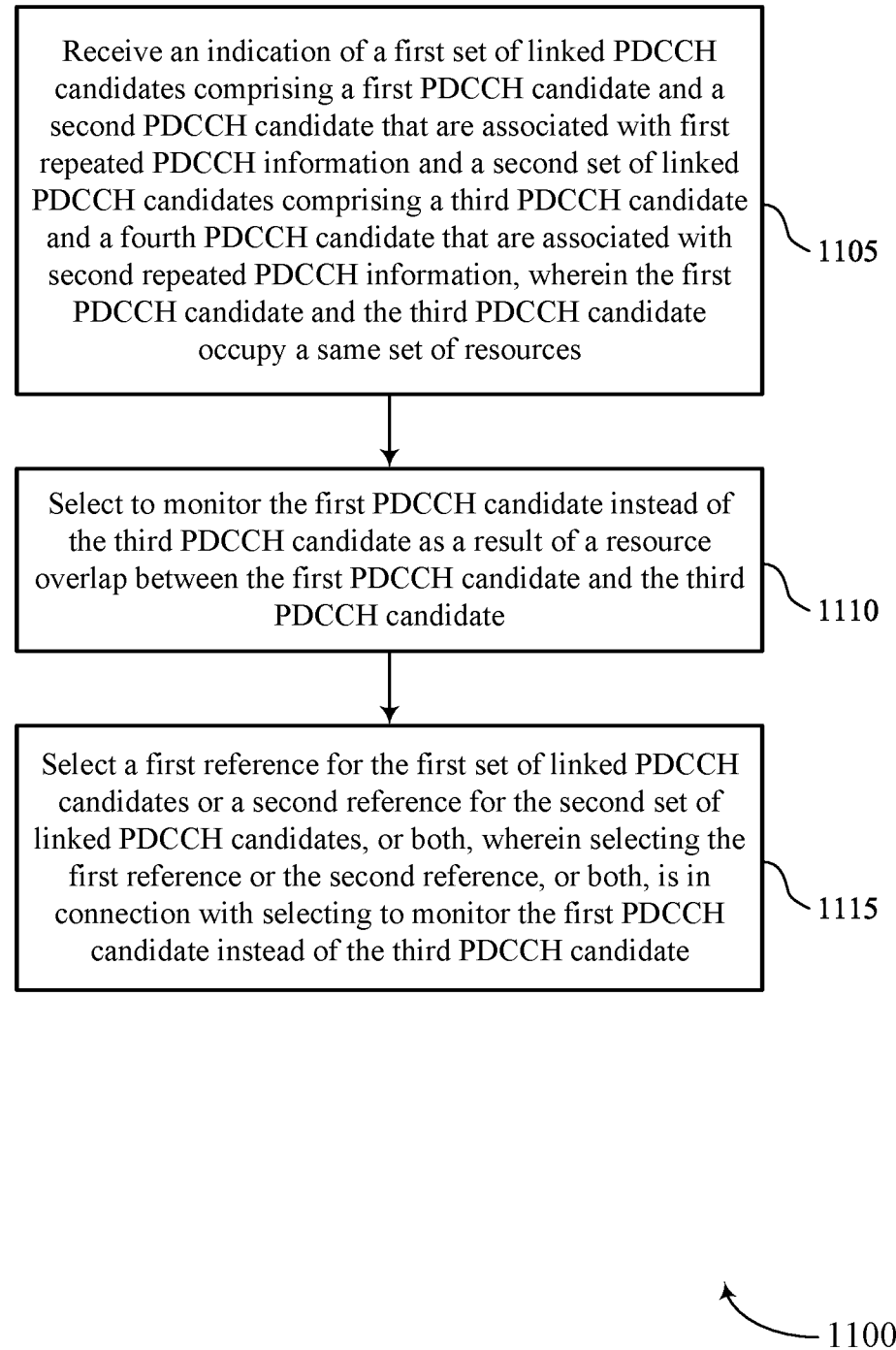
FIGS. 11 and 12 show flowcharts illustrating example methods that support managing the selection of reference PDCCH candidates in deployments featuring PDCCH repetition with overlapping SS sets.

FIG. 11 shows a flowchart illustrating an example method 1100 that supports managing the selection of reference PDCCH candidates in deployments featuring PDCCH repetition with overlapping SS sets. The operations of the method 1100 may be implemented by a UE or its components as described herein. For example, the operations of the method 1100 may be performed by a UE 115 as described with reference to FIGS. 1-9. In some examples, a UE may execute a set of instructions to control the functional elements of the UE to perform the described functions. Additionally, or alternatively, the UE may perform aspects of the described functions using special-purpose hardware.

At 1105, the method may include receiving an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources. The operations of 1105 may be performed in accordance with examples as disclosed herein.

At 1110, the method may include selecting to monitor the first PDCCH candidate instead of the third PDCCH candidate as a result of a resource overlap between the first PDCCH candidate and the third PDCCH candidate. The operations of 1110 may be performed in accordance with examples as disclosed herein.

At 1115, the method may include selecting a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate. The operations of 1115 may be performed in accordance with examples as disclosed herein.

Figure 12:
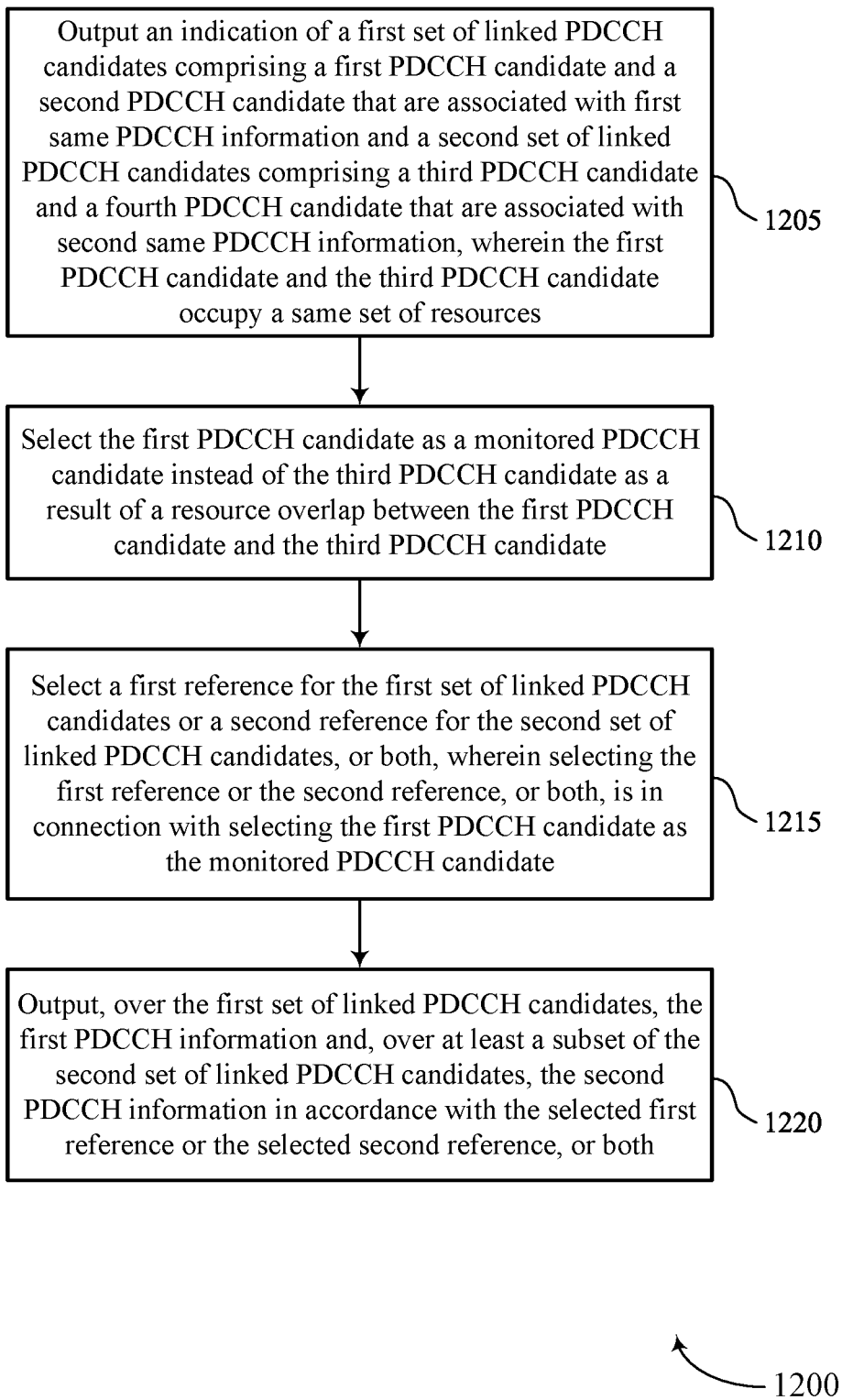

FIG. 12 shows a flowchart illustrating an example method 1200 that supports managing the selection of reference PDCCH candidates in deployments featuring PDCCH repetition with overlapping SS sets. The operations of the method 1200 may be implemented by a BS or its components as described herein. For example, the operations of the method 1200 may be performed by a BS 105 as described with reference to FIGS. 1-8 and 10. In some examples, a BS may execute a set of instructions to control the functional elements of the BS to perform the described functions. Additionally, or alternatively, the BS may perform aspects of the described functions using special-purpose hardware.

At 1205, the method may include outputting an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources. The operations of 1205 may be performed in accordance with examples as disclosed herein.

At 1210, the method may include selecting the first PDCCH candidate as a monitored PDCCH candidate instead of the third PDCCH candidate as a result of a resource overlap between the first PDCCH candidate and the third PDCCH candidate. The operations of 1210 may be performed in accordance with examples as disclosed herein.

At 1215, the method may include selecting a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate. The operations of 1215 may be performed in accordance with examples as disclosed herein.

At 1220, the method may include outputting, over the first set of linked PDCCH candidates, the first PDCCH information and, over at least a subset of the second set of linked PDCCH candidates, the second PDCCH information in accordance with the selected first reference or the selected second reference, or both. The operations of 1220 may be performed in accordance with examples as disclosed herein.

The following provides an overview of some aspects of the present disclosure:

Aspect 1: A method for wireless communication at a UE, including: receiving an indication of a first set of linked PDCCH candidates including a first PDCCH candidate and a second PDCCH candidate that are associated with first repeated PDCCH information and a second set of linked PDCCH candidates including a third PDCCH candidate and a fourth PDCCH candidate that are associated with second repeated PDCCH information, where the first PDCCH candidate and the third PDCCH candidate occupy a same set of resources; selecting to monitor the first PDCCH candidate instead of the third PDCCH candidate as a result of a resource overlap between the first PDCCH candidate and the third PDCCH candidate; and selecting a first reference for the first set of linked PDCCH candidates or a second reference for the second set of linked PDCCH candidates, or both, where selecting the first reference or the second reference, or both, is in connection with selecting to monitor the first PDCCH candidate instead of the third PDCCH candidate.

Aspect 2: The method of aspect 1, where selecting to monitor the first PDCCH candidate instead of the third PDCCH candidate as a result of the resource overlap between the first PDCCH candidate and the second PDCCH candidate is in accordance with a prohibition for the UE to receive both of the first PDCCH candidate and the third PDCCH candidate occupying the same set of resources.

Aspect 3: The method of aspect 1, where selecting to monitor the first PDCCH candidate instead of the third PDCCH candidate includes: selecting to monitor the first PDCCH candidate instead of the third PDCCH candidate as a result of the third PDCCH candidate having a first SS set index that is associated with a lower priority than a second SS set index of the first PDCCH candidate.

Aspect 4: The method of aspect 1, where selecting to monitor the first PDCCH candidate instead of the third PDCCH candidate includes: selecting to monitor the first PDCCH candidate instead of the third PDCCH candidate as a result of the fourth PDCCH candidate having a first SS set index that is associated with a lower priority than a second SS set index of the second PDCCH candidate.

Aspect 5: The method of aspect 1, where selecting to monitor the first PDCCH candidate instead of the third PDCCH candidate includes: selecting to monitor the first PDCCH candidate instead of the third PDCCH candidate as a result of the third PDCCH candidate having a first PDCCH candidate index that is lower than a second PDCCH candidate index of the first PDCCH candidate.

Aspect 6: The method of any of aspects 1-5, further including: refraining from monitoring over a monitoring occasion associated with the third PDCCH candidate as a result of selecting to monitor for the first PDCCH candidate instead of the third PDCCH candidate.

Aspect 7: The method of any of aspects 1-6, further including: refraining from monitoring over an SS set associated with the third PDCCH candidate as a result of selecting to monitor for the first PDCCH candidate instead of the third PDCCH candidate.

Aspect 8: The method of any of aspects 1-7, further including: monitoring the fourth PDCCH candidate, where selecting the second reference for the second set of linked PDCCH candidates is in accordance with monitoring the fourth PDCCH candidate.

Aspect 9: The method of aspect 8, further including: unlinking, from the second set of linked PDCCH candidates, the third PDCCH candidate in accordance with selecting to monitor the first PDCCH candidate instead of the third PDCCH candidate, where selecting the second reference for the second set of linked PDCCH candidates includes selecting the fourth PDCCH candidate as the second reference.

Aspect 10: The method of any of aspects 8 or 9, where selecting the second reference for the second set of linked PDCCH candidates includes: selecting the third PDCCH candidate or the fourth PDCCH candidate as the second reference for the second set of linked PDCCH candidates in accordance with a reference selection rule.

Aspect 11: The method of aspect 10, where the reference selection rule defines a procedure for selecting the second reference from a set of PDCCH candidates including monitored PDCCH candidates and unmonitored PDCCH candidates of the second set of linked PDCCH candidates.

Aspect 12: The method of any of aspects 1-7, further including: refraining from monitoring the fourth PDCCH candidate in accordance with selecting to monitor the first PDCCH candidate instead of the third PDCCH candidate, where selecting the first reference for the first set of linked PDCCH candidates or the second reference for the second set of linked PDCCH candidates includes selecting only the first reference for the first set of linked PDCCH candidates.

Aspect 13: The method of any of aspects 1-12, where selecting the first reference for the first set of linked PDCCH candidates or the second reference for the second set of linked PDCCH candidates, or both, includes: selecting the first PDCCH candidate or the second PDCCH candidate as the first reference for the first set of linked PDCCH candidates in accordance with a reference selection rule.

Aspect 14: The method of any of aspects 1-12, where selecting the first reference for the first set of linked PDCCH candidates or the second reference for the second set of linked PDCCH candidates, or both, includes: selecting the first PDCCH candidate, the second PDCCH candidate, or the fourth PDCCH candidate as the first reference for the first set of linked PDCCH candidates in accordance with a reference selection rule.

Aspect 15: The method of aspect 14, further including: linking the fourth PDCCH candidate with the first set of linked PDCCH candidates in accordance with selecting to monitor the first PDCCH candidate instead of the third PDCCH candidate and the reference selection rule.

Aspect 16: The method of any of aspects 1-15, further including: communicating with a component of a BS in accordance with the first reference or the second reference, or both, where scheduling information associated with the communicating with the component of the BS is a function of a time domain property or a frequency domain property of the first reference or the second reference, or both.

Aspect 17: A method for wireless communication at an apparatus of a BS, including: outputting an indication of a first set of linked PDCCH candidates including a first PDCCH candidate and a second PDCCH candidate that are associated with first same PDCCH information and a second set of linked PDCCH candidates including a third PDCCH candidate and a fourth PDCCH candidate that are associated with second same PDCCH information, where the first PDCCH candidate and the third PDCCH candidate occupy a same set of resources; selecting the first PDCCH candidate as a monitored PDCCH candidate instead of the third PDCCH candidate as a result of a resource overlap between the first PDCCH candidate and the third PDCCH candidate; selecting a first reference for the first set of linked PDCCH candidates or a second reference for the second set of linked PDCCH candidates, or both, where selecting the first reference or the second reference, or both, is in connection with selecting the first PDCCH candidate as the monitored PDCCH candidate; and outputting, over the first set of linked PDCCH candidates, the first PDCCH information and, over at least a subset of the second set of linked PDCCH candidates, the second PDCCH information in accordance with the selected first reference or the selected second reference, or both.

Aspect 18: The method of aspect 17, where selecting the first PDCCH candidate as the monitored PDCCH candidate instead of the third PDCCH candidate as a result of the resource overlap between the first PDCCH candidate and the third PDCCH candidate includes a prohibition for the BS to output both of the first PDCCH candidate and the third PDCCH candidate occupying the same set of resources.

Aspect 19: The method of aspect 17, where selecting the first PDCCH candidate as the monitored PDCCH candidate instead of the third PDCCH candidate includes: selecting the first PDCCH candidate as the monitored PDCCH candidate instead of the third PDCCH candidate as a result of the third PDCCH candidate having a first SS set index that is associated with a lower priority than a second SS set index of the first PDCCH candidate.

Aspect 20: The method of aspect 17, where selecting the first PDCCH candidate as the monitored PDCCH candidate instead of the third PDCCH candidate includes: selecting the first PDCCH candidate as the monitored PDCCH candidate instead of the third PDCCH candidate as a result of the fourth PDCCH candidate having a first SS set index that is associated with a lower priority than a second SS set index of the second PDCCH candidate.

Aspect 21: The method of aspect 17, where selecting the first PDCCH candidate as the monitored PDCCH candidate instead of the third PDCCH candidate includes: selecting the first PDCCH candidate as the monitored PDCCH candidate instead of the third PDCCH candidate as a result of the third PDCCH candidate having a first PDCCH candidate index that is lower than a second PDCCH candidate index of the first PDCCH candidate.

Aspect 22: The method of any of aspects 17-21, further including: selecting the fourth PDCCH candidate as another monitored PDCCH candidate, where selecting the second reference for the second set of linked PDCCH candidates is in accordance with selecting the fourth PDCCH candidate as the other monitored PDCCH candidate.

Aspect 23: The method of aspect 22, further including: unlinking, from the second set of linked PDCCH candidates, the third PDCCH candidate in accordance with selecting the first PDCCH candidate as the monitored PDCCH candidate instead of the third PDCCH candidate, where selecting the second reference for the second set of linked PDCCH candidates includes selecting the fourth PDCCH candidate as the second reference.

Aspect 24: The method of any of aspects 22 or 23, where selecting the second reference for the second set of linked PDCCH candidates includes: selecting the third PDCCH candidate or the fourth PDCCH candidate as the second reference for the second set of linked PDCCH candidates in accordance with a reference selection rule.

Aspect 25: The method of aspect 24, where the reference selection rule defines a procedure for selecting the second reference from a set of PDCCH candidates including monitored PDCCH candidates and unmonitored PDCCH candidates of the second set of linked PDCCH candidates.

Aspect 26: The method of any of aspects 17-21, further including: selecting the fourth PDCCH candidate as an unmonitored PDCCH candidate in accordance with selecting the first PDCCH candidate as the monitored PDCCH candidate instead of the third PDCCH candidate, where selecting the first reference for the first set of linked PDCCH candidates or the second reference for the second set of linked PDCCH candidates includes selecting only the first reference for the first set of linked PDCCH candidates.

Aspect 27: The method of any of aspects 17-26, where selecting the first reference for the first set of linked PDCCH candidates or the second reference for the second set of linked PDCCH candidates, or both, includes: selecting the first PDCCH candidate or the second PDCCH candidate as the first reference for the first set of linked PDCCH candidates in accordance with a reference selection rule.

Aspect 28: The method of any of aspects 17-26, where selecting the first reference for the first set of linked PDCCH candidates or the second reference for the second set of linked PDCCH candidates, or both, includes: selecting the first PDCCH candidate, the second PDCCH candidate, or the fourth PDCCH candidate as the first reference for the first set of linked PDCCH candidates in accordance with a reference selection rule.

Aspect 29: The method of aspect 28, further including: linking the fourth PDCCH candidate with the first set of linked PDCCH candidates in accordance with selecting the first PDCCH candidate as the monitored PDCCH candidate instead of the third PDCCH candidate and the reference selection rule.

Aspect 30: The method of any of aspects 17-29, further including: communicating in accordance with the first reference or the second reference, or both, where scheduling information associated with the communicating is a function of a time domain property or a frequency domain property of the first reference or the second reference, or both.

Aspect 31: An apparatus for wireless communication at a UE, including at least a first interface, a processing system, and a second interface configured to cause the apparatus to perform a method of any of aspects 1-16.

Aspect 32: An apparatus for wireless communication at a UE, including a processor; memory coupled with the processor; and instructions stored in the memory and executable by the processor to cause the apparatus to perform a method of any of aspects 1-16.

Aspect 33: An apparatus for wireless communication at a UE, including at least one means for performing a method of any of aspects 1-16.

Aspect 34: A non-transitory computer-readable medium storing code for wireless communication at a UE, the code including instructions executable by a processor to perform a method of any of aspects 1-16.

Aspect 35: An apparatus for wireless communication at a BS, including at least a first interface, a processing system, and a second interface configured to cause the apparatus to perform a method of any of aspects 17-30.

Aspect 36: An apparatus for wireless communication at an apparatus of a BS, including a processor; memory coupled with the processor; and instructions stored in the memory and executable by the processor to cause the apparatus to perform a method of any of aspects 17-30.

Aspect 37: An apparatus for wireless communication at an apparatus of a BS, including at least one means for performing a method of any of aspects 17-30.

Aspect 38: A non-transitory computer-readable medium storing code for wireless communication at an apparatus of a BS, the code including instructions executable by a processor to perform a method of any of aspects 17-30.

As used herein, the term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it may be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:
a first interface configured to:
obtain an indication of:
a first set of linked physical downlink control channel (PDCCH) candidates comprising a first PDCCH candidate of a first search space set and a second PDCCH candidate of a second search space set that are associated with first repeated PDCCH information, the first PDCCH candidate being linked with the second PDCCH candidate in accordance with the first search space set and the second search space set being linked via the indication; and
a second set of linked PDCCH candidates comprising a third PDCCH candidate of a third search space set and a fourth PDCCH candidate of a fourth search space set that are associated with second repeated PDCCH information, the third PDCCH candidate being linked with the fourth PDCCH candidate in accordance with the third search space set and the fourth search space set being linked via the indication, and the first PDCCH candidate and the third PDCCH candidate occupying a same set of control channel elements in a same control resource set; and
a processing system configured to:
select to monitor the first PDCCH candidate instead of the third PDCCH candidate in accordance with an expectation for PDCCH candidates of different sets of linked PDCCH candidates to occupy different control channel elements in a control resource set; and
select a first reference for the first set of linked PDCCH candidates or a second reference for the second set of linked PDCCH candidates, or both, in connection with selecting to monitor the first PDCCH candidate instead of the third PDCCH candidate.

2. The apparatus of claim 1, wherein the first PDCCH candidate and the third PDCCH candidate have identical scrambling and downlink control information (DCI) formats of a same size.

3. The apparatus of claim 1, wherein the processing system is further configured to:
select to monitor the first PDCCH candidate instead of the third PDCCH candidate as a result of the third PDCCH candidate having a first search space set index that is associated with a lower priority than a second search space set index of the first PDCCH candidate.

4. The apparatus of claim 1, wherein the processing system is further configured to:
select to monitor the first PDCCH candidate instead of the third PDCCH candidate as a result of the fourth PDCCH candidate having a first search space set index that is associated with a lower priority than a second search space set index of the second PDCCH candidate.

5. The apparatus of claim 1, wherein the processing system is further configured to:
select to monitor the first PDCCH candidate instead of the third PDCCH candidate as a result of the third PDCCH candidate having a first PDCCH candidate index that is lower than a second PDCCH candidate index of the first PDCCH candidate.

6. The apparatus of claim 1, wherein the processing system is further configured to:
refrain from monitoring over a monitoring occasion associated with the third PDCCH candidate in accordance with selecting to monitor the first PDCCH candidate instead of the third PDCCH candidate.

7. The apparatus of claim 1, wherein the processing system is further configured to:
refrain from monitoring over a search space (SS) set associated with the third PDCCH candidate in accordance with selecting to monitor the first PDCCH candidate instead of the third PDCCH candidate.

8. The apparatus of claim 1, wherein the processing system is further configured to:
monitor the fourth PDCCH candidate, selecting the second reference for the second set of linked PDCCH candidates being in accordance with monitoring the fourth PDCCH candidate.

9. The apparatus of claim 8, wherein the processing system is further configured to:
unlink, from the second set of linked PDCCH candidates, the third PDCCH candidate in accordance with selecting to monitor the first PDCCH candidate instead of the third PDCCH candidate, selecting the second reference for the second set of linked PDCCH candidates comprising selecting the fourth PDCCH candidate as the second reference.

10. The apparatus of claim 8, wherein the processing system is further configured to:
select the third PDCCH candidate or the fourth PDCCH candidate as the second reference for the second set of linked PDCCH candidates in accordance with a reference selection rule.

11. The apparatus of claim 10, wherein the reference selection rule defines a procedure for selecting the second reference from a set of PDCCH candidates including monitored PDCCH candidates and unmonitored PDCCH candidates of the second set of linked PDCCH candidates.

12. The apparatus of claim 1, wherein the processing system is further configured to:
refrain from monitoring the fourth PDCCH candidate in accordance with selecting to monitor the first PDCCH candidate instead of the third PDCCH candidate, selecting the first reference for the first set of linked PDCCH candidates or the second reference for the second set of linked PDCCH candidates comprising selecting only the first reference for the first set of linked PDCCH candidates.

13. The apparatus of claim 1, wherein the processing system is further configured to:
  select the first PDCCH candidate or the second PDCCH candidate as the first reference for the first set of linked PDCCH candidates in accordance with a reference selection rule.

14. The apparatus of claim 1, wherein the processing system is further configured to:
  select the first PDCCH candidate, the second PDCCH candidate, or the fourth PDCCH candidate as the first reference for the first set of linked PDCCH candidates in accordance with a reference selection rule.

15. The apparatus of claim 14, wherein the processing system is further configured to:
  link the fourth PDCCH candidate with the first set of linked PDCCH candidates in accordance with selecting to monitor the first PDCCH candidate instead of the third PDCCH candidate and the reference selection rule.

16. An apparatus for wireless communication at a base station (BS), comprising:
  a first interface configured to:
    output an indication of:
      a first set of linked physical downlink control channel (PDCCH) candidates comprising a first PDCCH candidate of a first search space set and a second PDCCH candidate of a second search space set that are associated with first repeated PDCCH information, the first PDCCH candidate being linked with the second PDCCH candidate in accordance with the first search space set and the second search space set being linked via the indication; and
      a second set of linked PDCCH candidates comprising a third PDCCH candidate of a third search space set and a fourth PDCCH candidate of a fourth search space set that are associated with second repeated PDCCH information, the third PDCCH candidate being linked with the fourth PDCCH candidate in accordance with the third search space set and the fourth search space set being linked via the indication, and the first PDCCH candidate and the third PDCCH candidate occupying a same set of control channel elements in a same control resource set; and
  a processing system configured to:
    select the first PDCCH candidate as a monitored PDCCH candidate instead of the third PDCCH candidate in accordance with an expectation for PDCCH candidates of different sets of linked PDCCH candidates to occupy different control channel elements in a control resource set; and
    select a first reference for the first set of linked PDCCH candidates or a second reference for the second set of linked PDCCH candidates, or both, in connection with selecting the first PDCCH candidate as the monitored PDCCH candidate; and
  the first interface or a second interface configured to:
    output, over the first set of linked PDCCH candidates, the first repeated PDCCH information and, over at least a subset of the second set of linked PDCCH candidates, the second repeated PDCCH information in accordance with the first reference or the second reference, or both.

17. The apparatus of claim 16, wherein the first PDCCH candidate and the third PDCCH candidate have identical scrambling and downlink control information (DCI) formats of a same size.

18. The apparatus of claim 16, wherein the processing system is further configured to:
  select the first PDCCH candidate as the monitored PDCCH candidate instead of the third PDCCH candidate as a result of the third PDCCH candidate having a first search space set index that is associated with a lower priority than a second search space set index of the first PDCCH candidate.

19. The apparatus of claim 16, wherein the processing system is further configured to:
  select the first PDCCH candidate as the monitored PDCCH candidate instead of the third PDCCH candidate as a result of the fourth PDCCH candidate having a first search space set index that is associated with a lower priority than a second search space set index of the second PDCCH candidate.

20. The apparatus of claim 16, wherein the processing system is further configured to:
  select the first PDCCH candidate as the monitored PDCCH candidate instead of the third PDCCH candidate as a result of the third PDCCH candidate having a first PDCCH candidate index that is lower than a second PDCCH candidate index of the first PDCCH candidate.

21. The apparatus of claim 16, wherein the processing system is further configured to:
  select the fourth PDCCH candidate as a second monitored PDCCH candidate, selecting the second reference for the second set of linked PDCCH candidates being in accordance with selecting the fourth PDCCH candidate as the second monitored PDCCH candidate.

22. The apparatus of claim 21, wherein the processing system is further configured to:
  unlink, from the second set of linked PDCCH candidates, the third PDCCH candidate in accordance with selecting the first PDCCH candidate as the monitored PDCCH candidate instead of the third PDCCH candidate, selecting the second reference for the second set of linked PDCCH candidates comprising selecting the fourth PDCCH candidate as the second reference.

23. The apparatus of claim 21, wherein the processing system is further configured to:
  select the third PDCCH candidate or the fourth PDCCH candidate as the second reference for the second set of linked PDCCH candidates in accordance with a reference selection rule.

24. A method for wireless communication at a user equipment (UE), comprising:
  receiving an indication of:
    a first set of linked physical downlink control channel (PDCCH) candidates comprising a first PDCCH candidate of a first search space set and a second PDCCH candidate of a second search space set that are associated with first repeated PDCCH information, the first PDCCH candidate being linked with the second PDCCH candidate in accordance with the first search space set and the second search space set being linked via the indication; and
    a second set of linked PDCCH candidates comprising a third PDCCH candidate of a third search space set and a fourth PDCCH candidate of a fourth search space set that are associated with second repeated PDCCH information, the third PDCCH candidate being linked with the fourth PDCCH candidate in accordance with the third search space set and the fourth search space set being linked via the indication, and the first PDCCH candidate and the third PDCCH candidate occupying a same set of control channel elements in a same control resource set;

selecting to monitor the first PDCCH candidate instead of the third PDCCH candidate in accordance with an expectation for PDCCH candidates of different sets of linked PDCCH candidates to occupy different control channel elements in a control resource set; and selecting a first reference for the first set of linked PDCCH candidates or a second reference for the second set of linked PDCCH candidates, or both, in connection with selecting to monitor the first PDCCH candidate instead of the third PDCCH candidate.

25. The method of claim 24, wherein the first PDCCH candidate and the third PDCCH candidate have identical scrambling and downlink control information (DCI) formats of a same size.

26. The method of claim 24, further comprising:
selecting to monitor the first PDCCH candidate instead of the third PDCCH candidate as a result of the third PDCCH candidate having a first search space set index that is associated with a lower priority than a second search space set index of the first PDCCH candidate.

27. The method of claim 24, further comprising:
selecting to monitor the first PDCCH candidate instead of the third PDCCH candidate as a result of the fourth PDCCH candidate having a first search space set index that is associated with a lower priority than a second search space set index of the second PDCCH candidate.

28. A method for wireless communication at an apparatus of a base station (BS), comprising:
outputting an indication of:
a first set of linked physical downlink control channel (PDCCH) candidates comprising a first PDCCH candidate of a first search space set and a second PDCCH candidate of a second search space set that are associated with first repeated PDCCH information, the first PDCCH candidate being linked with the second PDCCH candidate in accordance with the first search space set and the second search space set being linked via the indication; and a second set of linked PDCCH candidates comprising a third PDCCH candidate of a third search space set and a fourth PDCCH candidate of a fourth search space set that are associated with second repeated PDCCH information, the third PDCCH candidate being linked with the fourth PDCCH candidate in accordance with the third search space set and the fourth search space set being linked via the indication, and the first PDCCH candidate and the third PDCCH candidate occupying a same set of control channel elements in a same control resource set;

selecting the first PDCCH candidate as a monitored PDCCH candidate instead of the third PDCCH candidate in accordance with an expectation for PDCCH candidates of different sets of linked PDCCH candidates to occupy different control channel elements in a control resource set;

selecting a first reference for the first set of linked PDCCH candidates or a second reference for the second set of linked PDCCH candidates, or both, in connection with selecting the first PDCCH candidate as the monitored PDCCH candidate; and outputting, over the first set of linked PDCCH candidates, the first repeated PDCCH information and, over at least a subset of the second set of linked PDCCH candidates, the second repeated PDCCH information in accordance with the first reference or the second reference, or both.

29. The method of claim 28, wherein the first PDCCH candidate and the third PDCCH candidate have identical scrambling and downlink control information (DCI) formats of a same size.

30. The method of claim 28, wherein selecting the first PDCCH candidate as the monitored PDCCH candidate instead of the third PDCCH candidate comprises further comprising:
selecting the first PDCCH candidate as the monitored PDCCH candidate instead of the third PDCCH candidate as a result of the third PDCCH candidate having a first search space set index that is associated with a lower priority than a second search space set index of the first PDCCH candidate.

* * * * *